US012759652B2

(12) United States Patent
Rust

(10) Patent No.: US 12,759,652 B2
(45) Date of Patent: Oct. 13, 2026

(54) SYSTEM AND METHOD FOR TRAILER PROPULSION

(71) Applicant: Anamnesis Corporation, San Francisco, CA (US)

(72) Inventor: Ian C. Rust, San Francisco, CA (US)

(73) Assignee: Anamnesis Corporation, San Francisco, CA (US)

( * ) Notice: Subject to any disclaimer, the term of this patent is extended or adjusted under 35 U.S.C. 154(b) by 219 days.

(21) Appl. No.: 18/916,522

(22) Filed: Oct. 15, 2024

(65) Prior Publication Data

US 2025/0033719 A1 Jan. 30, 2025

Related U.S. Application Data

(63) Continuation-in-part of application No. 18/591,999, filed on Feb. 29, 2024, which is a continuation of
(Continued)

(51) Int. Cl.
*B62D 59/02* (2006.01)
*B60D 1/24* (2006.01)
(Continued)

(52) U.S. Cl.
CPC ............... *B62D 59/02* (2013.01); *B60D 1/24* (2013.01); *B60K 1/04* (2013.01); *B60L 53/16* (2019.02);
(Continued)

(58) Field of Classification Search
CPC .... B62D 13/00; B62D 53/0842; B62D 59/02; B60D 1/24; B60K 1/04; B60L 53/16
(Continued)

(56) References Cited

U.S. PATENT DOCUMENTS 2,153,468 A 4/1939 Heyn
3,479,055 A 11/1969 Cunha et al.
(Continued)

FOREIGN PATENT DOCUMENTS

DE 102016203224 B4 * 1/2018 ......... B62D 53/0842
EP 0053001 A1 6/1982
(Continued)

OTHER PUBLICATIONS

"Development of a sensory kingpin", Fraunhofer, https://www.ist.fraunhofer.de/en/newsletter/info-hub/sensory-kingpin.html, first downloaded Mar. 13, 2024.
(Continued)

*Primary Examiner* — Kevin Hurley
*Assistant Examiner* — Felicia L. Brittman-Alabi
(74) *Attorney, Agent, or Firm* — Jeffrey Schox; Evan Myers

(57) ABSTRACT

The vehicle system can include: a set of vehicle couplings (e.g., a tractor interface, a trailer interface, etc.); a chassis, a battery pack, an electric powertrain, a sensor suite, and a controller. The modular vehicle system can optionally include landing gear, a suspension, and any other suitable set of components. The vehicle system functions to structurally support and/or tow a trailer—such as a Class 8 semi-trailer—and/or to augment/supplement a tractor propulsive capability (e.g., via a diesel/combustion engine) with a supplementary electric drive axle(s).

20 Claims, 16 Drawing Sheets

Related U.S. Application Data application No. 18/224,336, filed on Jul. 20, 2023, which is a continuation of application No. 17/849,003, filed on Jun. 24, 2022, now Pat. No. 11,787,487.

(60) Provisional application No. 63/590,340, filed on Oct. 13, 2023, provisional application No. 63/214,688, filed on Jun. 24, 2021.

(51) Int. Cl.
*B60K 1/04* (2019.01)
*B60L 53/16* (2019.01)
*B62D 13/00* (2006.01)
*B62D 53/08* (2006.01)

(52) U.S. Cl.
CPC ......... *B62D 13/00* (2013.01); *B62D 53/0842* (2013.01)

(58) Field of Classification Search
USPC ........................................................ 180/14.1
See application file for complete search history.

(56) References Cited

U.S. PATENT DOCUMENTS 4,070,033 A 1/1978 Weir et al.
4,741,549 A 5/1988 Gevers
4,762,192 A 8/1988 Maxwell
4,768,802 A 9/1988 Winkler
5,067,741 A 11/1991 Ayme
5,626,356 A * 5/1997 Harwood ........... B62D 53/0864 280/441
5,924,716 A 7/1999 Burkhart et al.
6,036,217 A 3/2000 Burkhart et al.
6,152,475 A 11/2000 Poole
6,257,611 B1 7/2001 Muldoon
6,450,523 B1 9/2002 Masters et al.
6,796,572 B1 9/2004 McGhie
8,317,452 B2 11/2012 Lundin
8,353,521 B1 1/2013 Seeley
8,909,426 B2 12/2014 Rhode et al.
9,290,202 B2 3/2016 Lavoie
10,449,954 B2 10/2019 Layfield et al.
11,396,326 B2 7/2022 Newton et al.
2007/0090688 A1 4/2007 Haemmerling et al.
2009/0250901 A1 10/2009 Lundin
2011/0074132 A1 3/2011 Banwart
2014/0015223 A1 1/2014 Banwart
2014/0303847 A1 10/2014 Lavoie
2015/0291179 A1 10/2015 Tagesson
2016/0009302 A1 1/2016 Bryant et al.
2016/0068165 A1 3/2016 Chen et al.
2016/0082964 A1 3/2016 Chunodkar et al.
2016/0303485 A1 10/2016 Kawamura et al.
2017/0015163 A1 1/2017 Sielhorst
2017/0211999 A1 7/2017 Bradford et al.
2018/0304944 A1 10/2018 Wright
2018/0345952 A1 12/2018 Layfield et al.
2018/0346042 A1 12/2018 Elliott et al.
2018/0364738 A1 12/2018 Bridges
2019/0161119 A1 5/2019 Greenwood et al.
2019/0217831 A1 7/2019 Viele
2019/0225286 A1 7/2019 Schutt et al.
2020/0001920 A1 1/2020 Hejase et al.
2020/0010059 A1 1/2020 Busse
2020/0018635 A1 1/2020 Reichow et al.
2020/0055357 A1 2/2020 Laine
2020/0101950 A1 4/2020 Tiwari et al.
2020/0130582 A1 4/2020 Wong et al.
2020/0175786 A1 6/2020 Bongers et al.
2020/0180691 A1 6/2020 Sandblom et al.
2020/0198423 A1 6/2020 Reed et al.
2020/0210726 A1 7/2020 Yang et al.
2020/0294401 A1 9/2020 Kerecsen
2020/0324763 A1 10/2020 Switkes et al.
2020/0331547 A1 10/2020 Kowalchuk
2021/0080961 A1 3/2021 Shenai et al.
2021/0114597 A1 4/2021 Tagesson et al.
2021/0138639 A1 5/2021 De Lange et al.
2021/0159827 A1 5/2021 Pramod et al.
2021/0197645 A1 7/2021 Larson et al.
2021/0294333 A1 9/2021 Jing et al.
2022/0017161 A1 1/2022 Layfield et al.
2022/0026912 A1 1/2022 Wu et al.
2022/0041069 A1 2/2022 Layfield et al.
2022/0161782 A1 5/2022 Laine et al.
2022/0169261 A1 6/2022 Kollberg et al.
2022/0177033 A1 6/2022 Laine et al.
2022/0185048 A1 6/2022 Yhr et al.
2022/0185329 A1 6/2022 Deragarden
2022/0281464 A1 9/2022 Sandblom et al.
2022/0355860 A1 11/2022 Rydström et al.
2022/0410990 A1 12/2022 Rust
2023/0082801 A1 3/2023 Laine et al.
2023/0096655 A1 3/2023 Persson et al.
2023/0097576 A1 3/2023 Laine et al.
2023/0112013 A1 4/2023 Laine
2023/0312029 A1* 10/2023 Layfield .................. B60K 1/00 180/6.5
2023/0415746 A1 12/2023 Ghandriz et al.

FOREIGN PATENT DOCUMENTS

EP 2634018 A1 9/2013
WO 2015042169 A1 3/2015
WO 2018210865 A1 11/2018
WO 2020107125 A1 6/2020

OTHER PUBLICATIONS

"Nuttalltrailers, 12 Ton Single Axle Jeep", http://web.archive.org/web/20220403071308/http://nuttalltrailers.com/id114.html, Apr. 2022 ( Year: 2022).
Rust, Ian C., et al., "Combination Vehicle System and/or Method", U.S. Appl. No. 18/226,702, filed Jul. 26, 2023.
Rust, Ian C., et al., "System and Method for Trailer Propulsion", U.S. Appl. No. 18/916,522, filed Oct. 15, 2024.
Tong, Wu , "Solutions for Tractor-trailer Path following at Low Speed", Aug. 5, 2017, Auburn University, pp. 1-120 (Year: 2017.

* cited by examiner

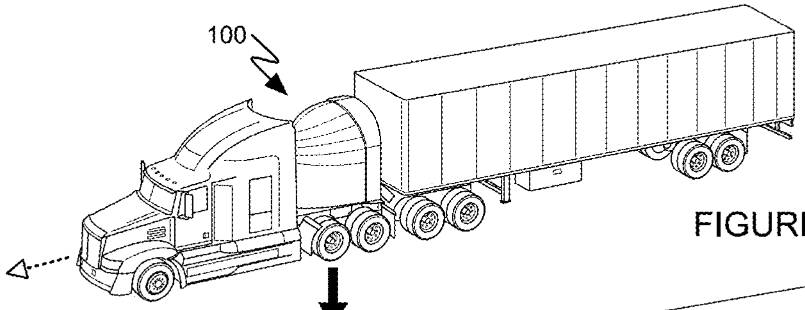
FIGURE 14A
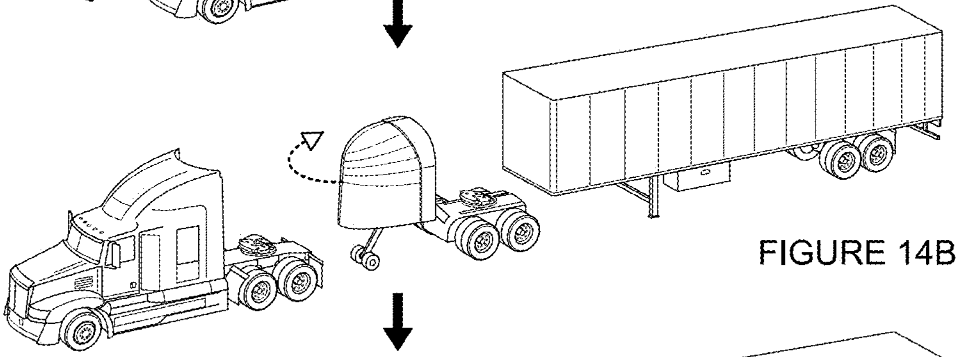
FIGURE 14B
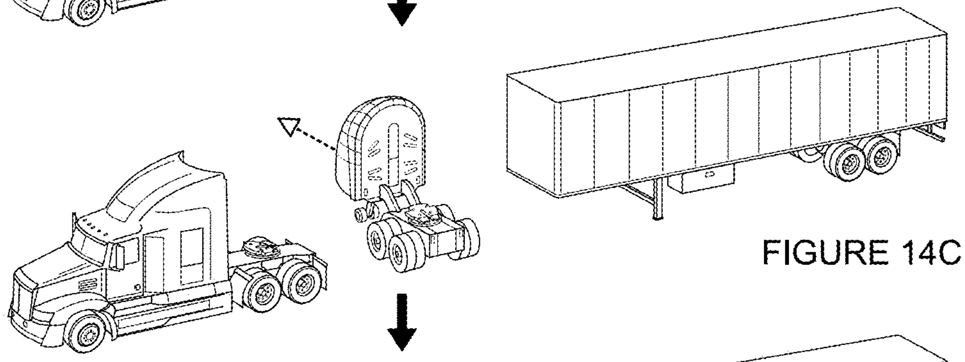
FIGURE 14C
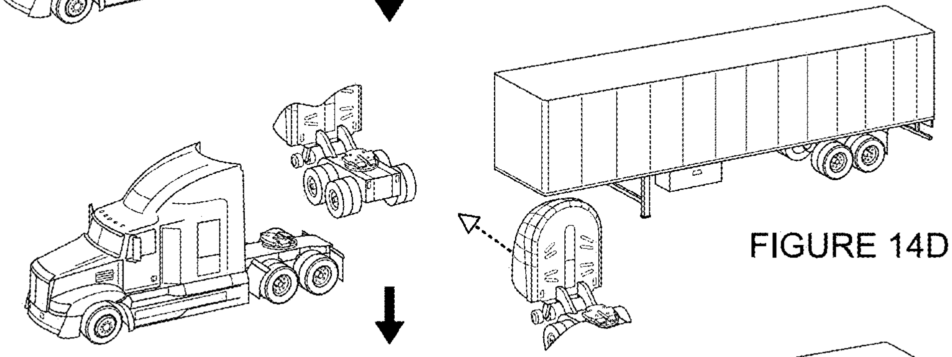
FIGURE 14D
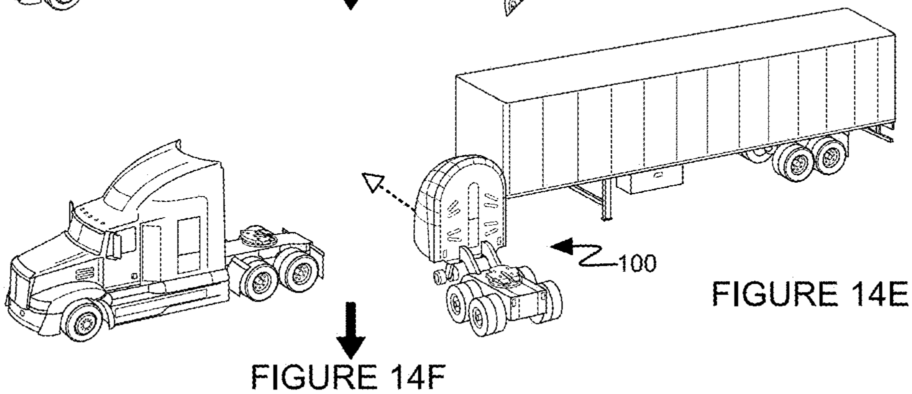
FIGURE 14E
FIGURE 14F

SYSTEM AND METHOD FOR TRAILER PROPULSION

CROSS REFERENCE TO RELATED APPLICATIONS

This application claims the benefit of U.S. Application Ser. No. 63/590,340, filed 13 Oct. 2023, which is incorporated herein in its entirety by this reference.

This application is a continuation-in-part of U.S. application Ser. No. 18/591,999, filed 29 Feb. 2024, titled "SYSTEM AND METHOD FOR TRAILER PROPULSION", which is a continuation of U.S. application Ser. No. 18/224,336, filed 20 Jul. 2023, which is a continuation of U.S. application Ser. No. 17/849,003, filed 24 Jun. 2022, which claims the benefit of U.S. Provisional Application No. 63/214,688, filed 24 Jun. 2021, each of which is incorporated herein in its entirety by this reference.

This application is related to U.S. application Ser. No. 18/592,063, filed 29 Feb. 2024, titled "VEHICLE SYSTEM AND LONGITUDINAL VEHICLE CONTROL METHOD", which is a continuation of U.S. application Ser. No. 18/374,323, filed 28 Sep. 2023, which is a divisional of U.S. application Ser. No. 17/889,884, filed 17 Aug. 2022, which claims the benefit of U.S. Provisional Application No. 63/233,936, filed 17 Aug. 2021, each of which is incorporated herein in its entirety by this reference.

TECHNICAL FIELD

This invention relates generally to the transportation field, and more specifically to a new and useful sensor system and/or method in the transportation field.

BRIEF DESCRIPTION OF THE FIGURES

FIGS. 14A-14J collectively illustrate an example of vehicle system use.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 9A:
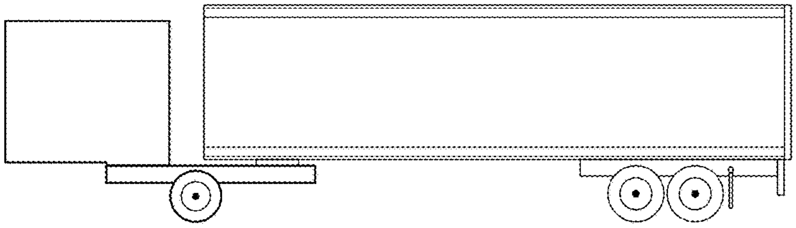
FIGS. 9A-9C are diagrammatic examples of a first, second, and third vehicle configuration for variants of the vehicle system.
Figure 9B:
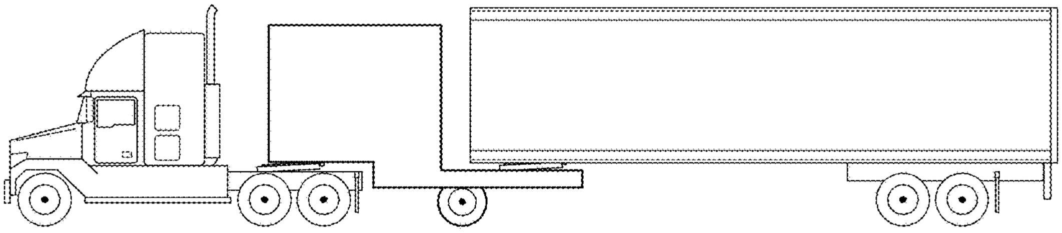
Figure 9C:
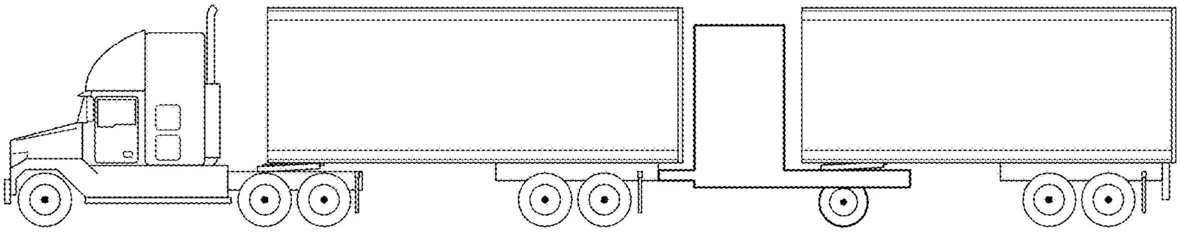

The vehicle system 100 can include: a set of vehicle couplings 110 (e.g., a tractor interface, a trailer interface, etc.); a chassis 120, a battery pack 130, an electric powertrain 140, a sensor suite 150, and a controller 160. The modular vehicle system 100 can optionally include landing gear 170, a suspension 180, and any other suitable set of components. The vehicle system functions to structurally support and/or tow a trailer—such as a Class 8 semi-trailer—and/or to augment/supplement a tractor propulsive capability (e.g., via a diesel/combustion engine) with a supplementary electric drive axle(s), examples of which are shown in FIGS. 9A-C. In variants, the vehicle system can be classified/certified as a converter dolly, a tractor (or secondary tractor), and/or under another vehicle classification.

The controller can include a battery management system (BMS), motor controller (or motor inverter), and/or any other suitable components. The electric powertrain can include: an electric (traction) motor, a transmission, a drive axle, a pair of wheels, and frictional brakes. However, the electric powertrain can include any suitable set of components.

The term "substantially" as utilized herein can mean: exactly, approximately, within a predetermined threshold or tolerance, and/or have any other suitable meaning.

1.1 Illustrative Example

In an illustrative example, a roadway electric vehicle (EV) system configured to connect between a semi-tractor and a trailer can include: a chassis defining a longitudinal axis; a kingpin configured to couple the chassis to a fifth wheel of the semi-tractor; a sensor platform connecting the kingpin to the chassis, the sensor platform comprising a first sensor configured to measure a longitudinal force between the kingpin and the chassis; a secondary fifth wheel mounted to the chassis and configured to couple the trailer to the chassis; an electric drivetrain including: a traction motor and a steering drive axle; a battery system comprising a set of battery cells and optionally a charge port; and optionally a set of extendable landing gear (e.g., a set of front wheels) mounted to the chassis forward of the steering drive axle, wherein the extendable landing gear is operable between an extended mode (e.g., when the roadway EV system is disconnected from the semi-tractor) and a retracted mode (e.g., when the roadway EV system is connected to the semi-tractor).

In a second illustrative example, the system can include a multi-axis sensory kingpin (e.g., 2-axis, 3-axis) with integrated force sensing. For instance, multi-axis force sensing can facilitate longitudinal force estimation (e.g., by fusing force measurements at the kingpin) for autonomous vehicle control.

2. Benefits

Variations of the technology can afford several benefits and/or advantages.

First, variations of this technology can enable aftermarket trucking electrification with minimal (e.g., zero) hardware installations or retrofits on a tractor and/or trailer. In such variants, the vehicle system can be attached at the fifth wheel of the tractor and connect to the trailer at a secondary fifth wheel (a.k.a. 'sixth wheel') between the tractor and the trailer, providing at least one intervening electric drive axle between the tractor and trailer. The electric powertrain of the vehicle system can provide electric arbitrage, as electric propulsion can be cheaper per usable watt, and may additionally lower overall maintenance costs (e.g., by reducing load on the expensive-to-maintain diesel engine of the tractor, by reducing frictional brake wear, etc.).

Second, variations of the technology can reduce or eliminate vehicle downtime as a result of battery charging and/or can extend the effective range of the vehicle (e.g., without creating 'electric range anxiety'). In such variants, the vehicle system may be selectively added or removed in the same or similar process to attaching a trailer, which can allow it to be removed in a low battery state (e.g., separated from the tractor for remote charging), passively towed (e.g., in a depleted battery state), and/or replaced with a second vehicle system (e.g., which is fully charged, with greater SoC). Thus, the vehicle system can be seen as effectively creating a plug-in hybrid architecture when connected in parallel with a tractor engine (e.g., diesel), but which may not require the vehicle to remain idle for battery charging (although this may be desirable, such as during vehicle hoteling, etc.).

Third, variations of the technology can be used to provide autonomous torque augmentation for a diesel engine and/or an internal combustion engine (ICE), which can improve vehicle acceleration performance, such as when employed in conjunction with an undersized tractor engine (e.g., small engine relative to gross vehicle weight [GVW], etc.). In such variants, the battery of the vehicle system can effectively replace combustibles as the core functional power source used to tow a trailer (e.g., where the tractor functionally becomes a seat/enclosure for a driver; where towing forces/loads at the fifth wheel of the tractor may not scale with trailer loads) and/or provide a majority of baseline propulsive torque (e.g., in a at steady state cruise, etc.) and/or marginal torque (e.g., during hill climbs, etc.).

However, variations of the technology can additionally or alternately provide any other suitable benefits and/or advantages.

3. System

Figure 1:
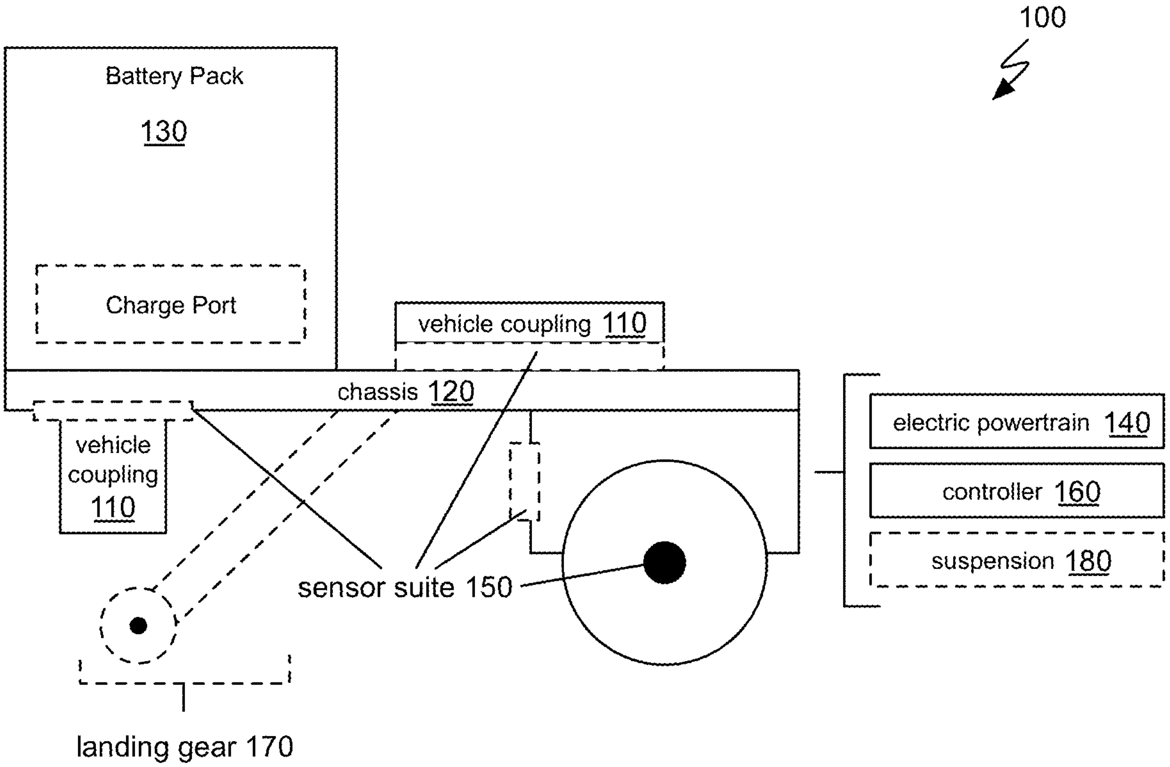
FIG. 1 is a schematic representation of a variant of the vehicle system.

The vehicle system 100, an example of which is shown in FIG. 1, can include: a set of vehicle couplings 110 (e.g., defining a tractor interface, a trailer interface, etc.); a chassis 120, a battery pack 130, an electric powertrain 140, a sensor suite 150, and a controller 160. The modular vehicle system 100 can optionally include landing gear 170, a suspension 180, and any other suitable set of components. The vehicle system functions to structurally support and/or tow a trailer—such as a Class 8 semi-trailer—and/or to augment/supplement a tractor propulsive capability (e.g., via a diesel/combustion engine) with a supplementary electric drive axle(s).

The vehicle system 100 is preferably a land vehicle and more preferably road vehicle (roadway vehicle), but can additionally or alternatively be an off-road vehicle, rail vehicle, and/or any other suitable type of vehicle. Additionally or alternatively, the vehicle system can include or be used with a semi-truck (e.g., Class 8 tractor), a trailer, and/or any other suitable vehicle(s). In a first example, the vehicle system 100 is a roadway electric vehicle (EV) system configured to connect between a semi-tractor and a trailer. In a second example, the vehicle system 100 can be an electrified converter dolly. In a third example, the vehicle system 100 can be an autonomous EV (e.g., configured to independently maneuver, configured to autonomously control the electric powertrain, etc.).

Each of the set of vehicle couplings 110 can function to couple, hitch, and/or connect the vehicle system to an adjacent vehicle, such as a tractor or trailer, along a respective mechanical interface. Additionally or alternatively, the set of vehicle couplings are preferably configured to transfer forces (e.g., longitudinal forces, vertical forces, lateral forces, etc.; 3-axis forces) between the vehicle system and the adjacent vehicle (e.g., tractor; trailer; etc.) to facilitate traversal.

The set of vehicle couplings can include: a fifth wheel (hitch), a kingpin, a trailer hitch, a pintle hitch coupling, a receiver hitch, a gooseneck hitch, a towing/trailing portion of one of the aforementioned couplings, and/or any other suitable set of vehicle coupling(s).

Figure 1A:
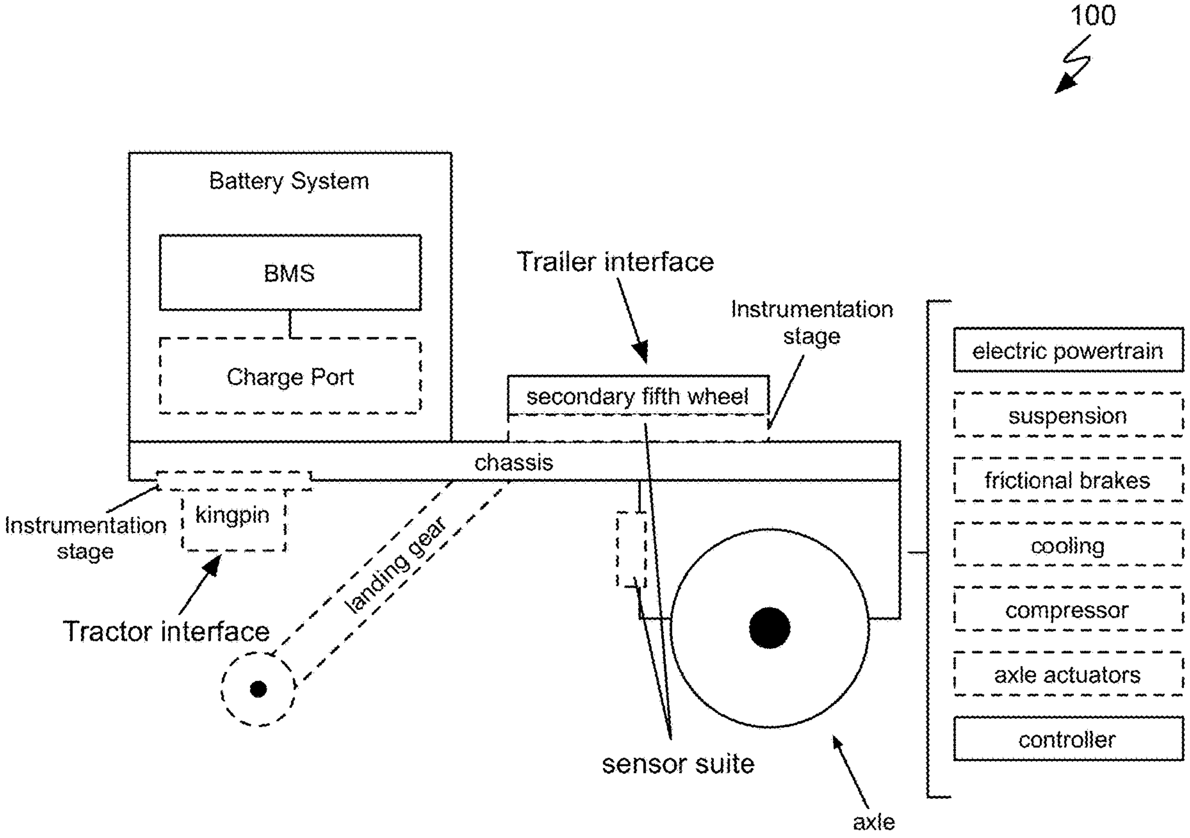
FIGS. 1A and 1B are a first and second schematic example of a variant of the vehicle system, respectively.
Figure 1B:
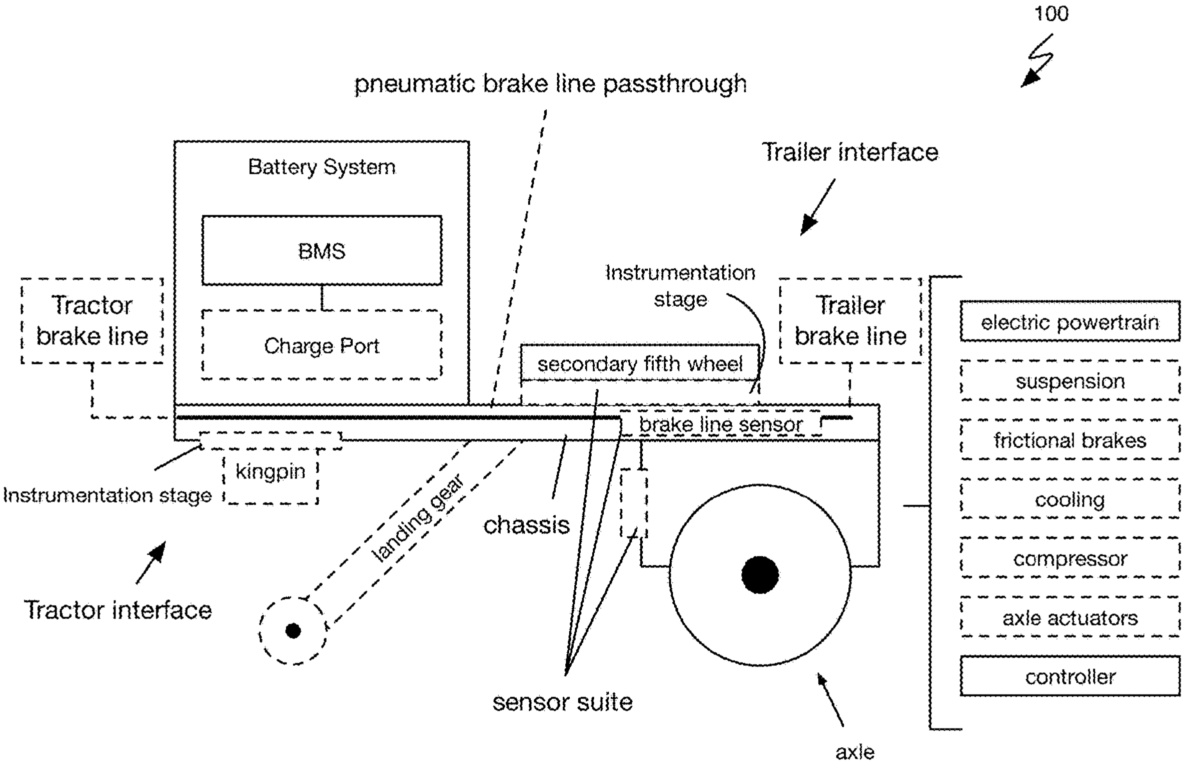

In one set of variants (e.g., an example is shown in FIG. 1A, a second example is shown in FIG. 1B), the set of vehicle couplings can include and/or define a first mechanical interface at a leading end relative to a longitudinal axis of the vehicle which is configured to connect to a tractor (e.g., a.k.a., a tractor interface) and a second mechanical interface at a trailing end relative to a longitudinal axis of the vehicle which is configured to connect to a trailer (a.k.a., a trailer interface).

Figure 2A:
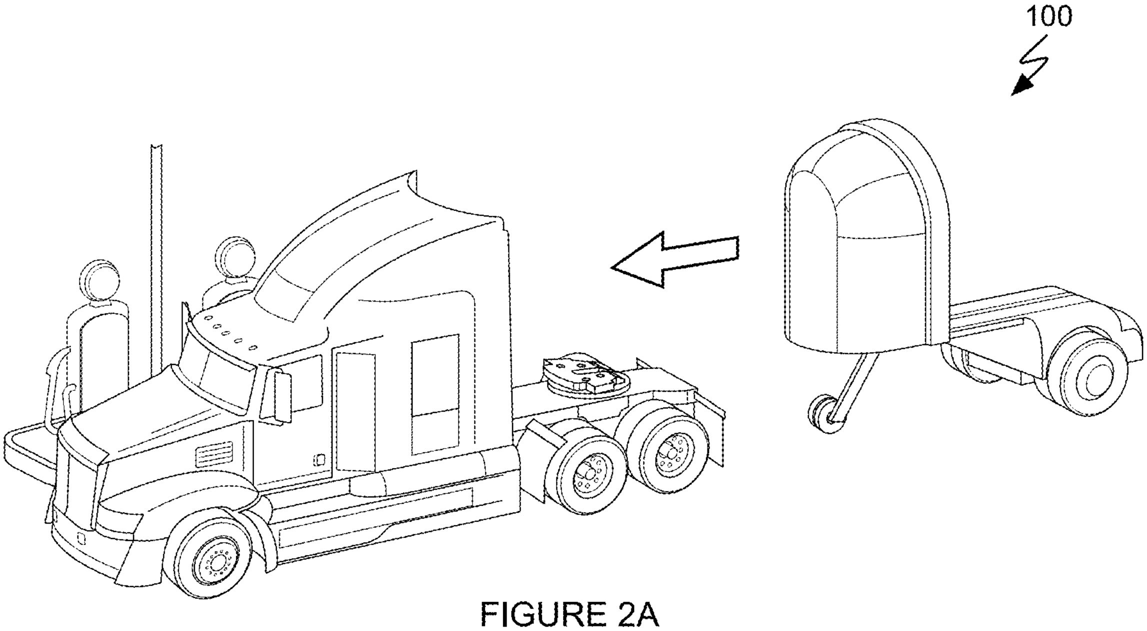
FIGS. 2A and 2B are diagrammatic examples of a first and second configuration of a variant of the vehicle system.
Figure 2B:
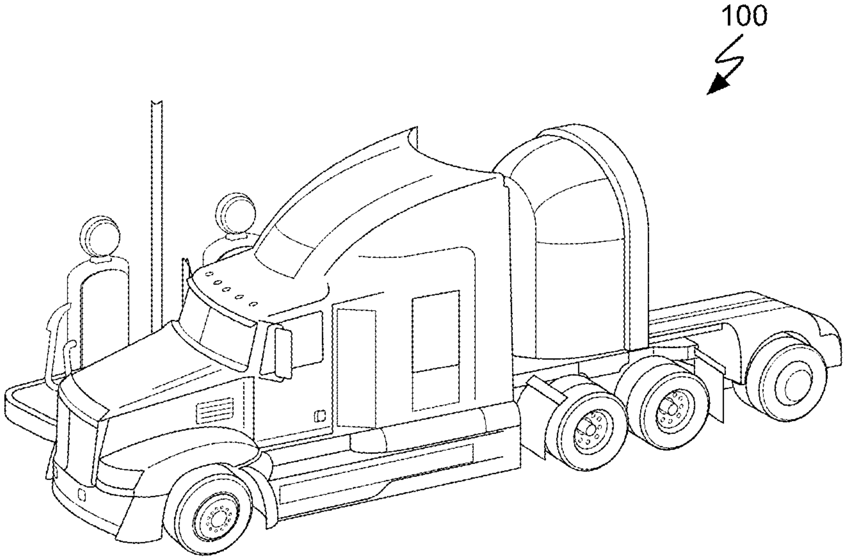

The tractor interface functions to mechanically connect the vehicle system to a tractor (an example is shown in FIGS. 2A and 2B). The tractor interface is preferably configured to be hitched directly to a standard fifth wheel coupling of a tractor, however the tractor interface can additionally or alternatively be indirectly connected to the tractor—such as by way of an intervening instance of the vehicle system (e.g., chained together), intervening trailer (e.g., for a road train, an example is shown in FIGS. 9A-C), and/or any other suitable intervening hardware. The tractor interface is preferably rotatable (e.g., bolster-bowl in conjunction with a shear interface, kingpin), but can additionally or alternatively be fixed/rigid (e.g., constrained in six degrees freedom of rigid body motion). In a first example, the tractor interface is a kingpin. In a second example, the tractor interface can be configured to connect to a converter dolly (e.g., by a fifth wheel coupling; an example is shown in FIG. 9C).

In variants—such as when the vehicle system may be classified as a converter dolly—the tractor interface can include and/or be used with a drawbar (e.g., to meet regulatory/certification standards). In a first example, the front end of the chassis and a kingpin can be a drawbar. The drawbar can be configured to bear vertical loads (e.g., 10 k-40 k lbs, support a vertical load based on the mass of the trailer, etc.) and/or can be configured to transfer pitch moments between the tractor and the vehicle system. However, the drawbar can additionally or alternatively be (vertically) unloaded. However, the tractor interface and vehicle system can alternatively exclude a drawbar.

However, the system can include any other suitable tractor interface.

Figure 3A:
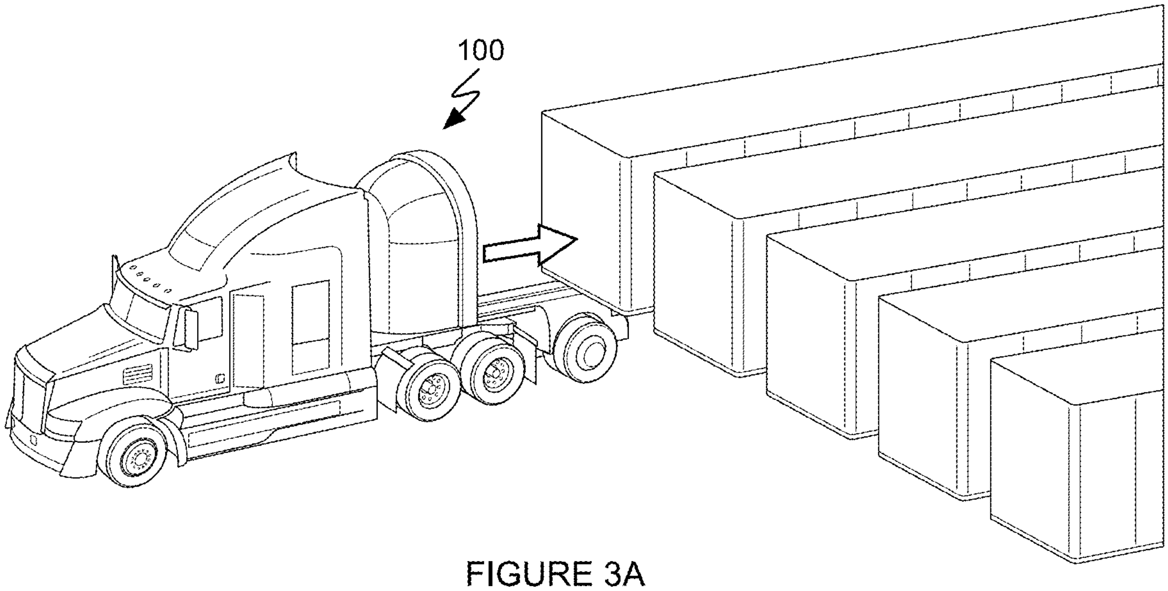
FIGS. 3A and 3B are diagrammatic examples of a first and second configuration of a variant of the vehicle system.
Figure 3B:
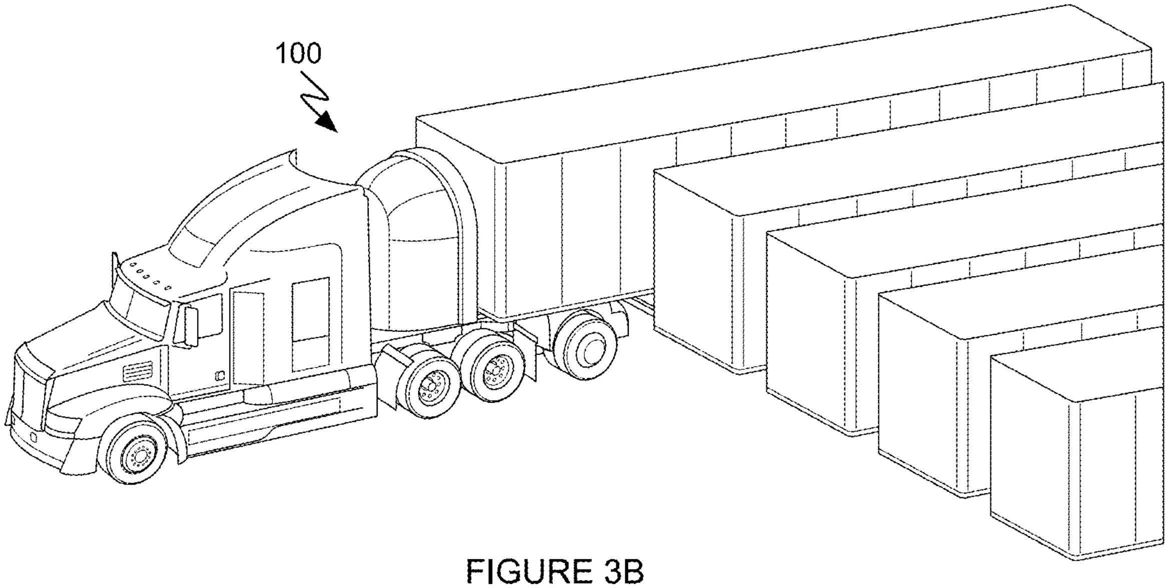

The trailer interface functions to mechanically connect the system to a trailer (an example is shown in FIGS. 3A and 3B). The trailer interface includes a secondary fifth wheel (hereinafter interchangeable with 'sixth wheel'), which is configured to engage the kingpin of a trailer. The trailer interface and/or the engagement surface of the sixth wheel (e.g., upper surface) thereof is preferably arranged substantially in parallel with the tractor interface (e.g., upper engagement surface of the tractor fifth wheel and/or lower engagement surface of kingpin connection), however can additionally or alternatively be substantially planar with the tractor interface, within a predetermined height offset of the tractor interface (e.g., less than six inches), within a predetermined skew angle, and/or otherwise arranged relative to the tractor interface.

In a specific example, a first vehicle coupling defines an inferior contact surface (e.g., a trailer interface) and a horizontal reference plane six inches above the inferior contact surface and a second vehicle coupling (e.g., trailer interface) is mounted below the horizontal reference plane.

However, the system can include any other suitable trailer interface.

Figure 4A:
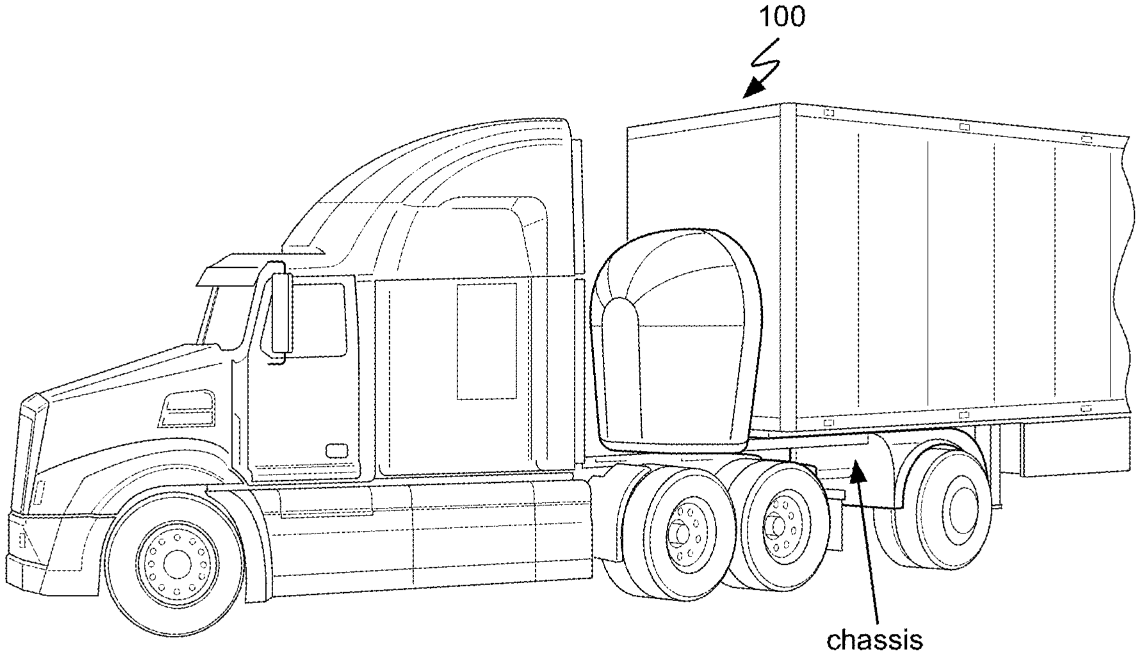
FIGS. 4A and 4B are a first and second illustrative example of a variant of the vehicle system.
Figure 4B:
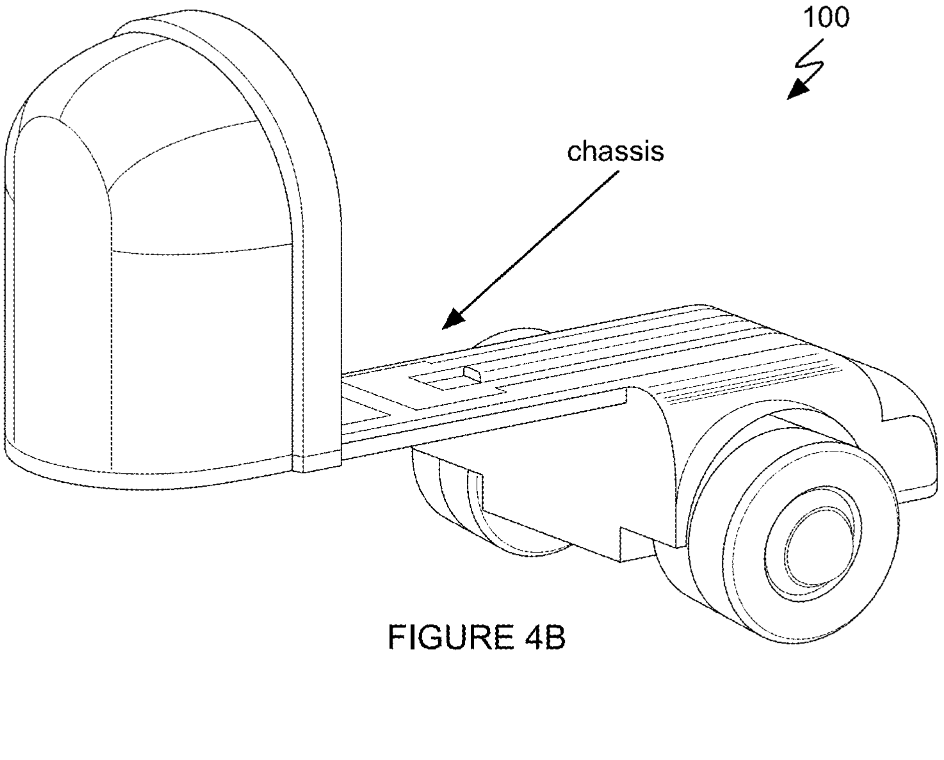

The chassis 120 functions to mount the battery pack 130 and the electric powertrain 140 and additionally or alternatively can function to transmit structural loads between any subset(s) of: the tractor interface, the trailer interface, and/or the wheels/electric powertrain (an example is shown in FIGS. 4A-B). Additionally or alternatively, the chassis can mount/arrange the tractor interface and/or trailer interface at a first and second end of the vehicle system, respectively. The tractor interface is preferably mounted on an underside of the chassis and/or oriented downward (e.g., surface normal directed toward the ground). Likewise, the trailer interface is preferably mounted to a superior surface of the chassis and/or oriented upwards (e.g., surface normal directed away from the ground).

The structure of the chassis 120 preferably sets a distance between the tractor interface and the trailer interface. The distance between the tractor and trailer interfaces is preferably fixed, but can additionally or alternatively be variable and/or adjustable (e.g., by shifting a mounting position of the trailer interface lengthwise along the chassis, such as to reduce an air gap between the tractor and trailer). The distance between the tractor and trailer interfaces can be: less than 50 cm, 50 cm, 100 cm, 150 cm, 200 cm, 250 cm, 300 cm, 400 cm, 500 cm, 850 cm, 855 cm, greater than 855 cm, less than 1 wheel diameter (e.g., relative to a wheel of the tractor and/or wheel mounted to the a drive axle of the vehicle system; 22.5 inches), 1 wheel diameter, 2 wheel diameters, 4 wheel diameters, 6 wheel diameters, 10 wheel diameters, greater than 10 wheel diameters, any range bounded by the aforementioned values and/or any other suitable distance. In a specific example, the distance between the tractor and the trailer interface can be predetermined based on a maximum distance between a rear axle and the fifth wheel coupling (at the tractor), but can be otherwise suitably determined.

Figure 6:
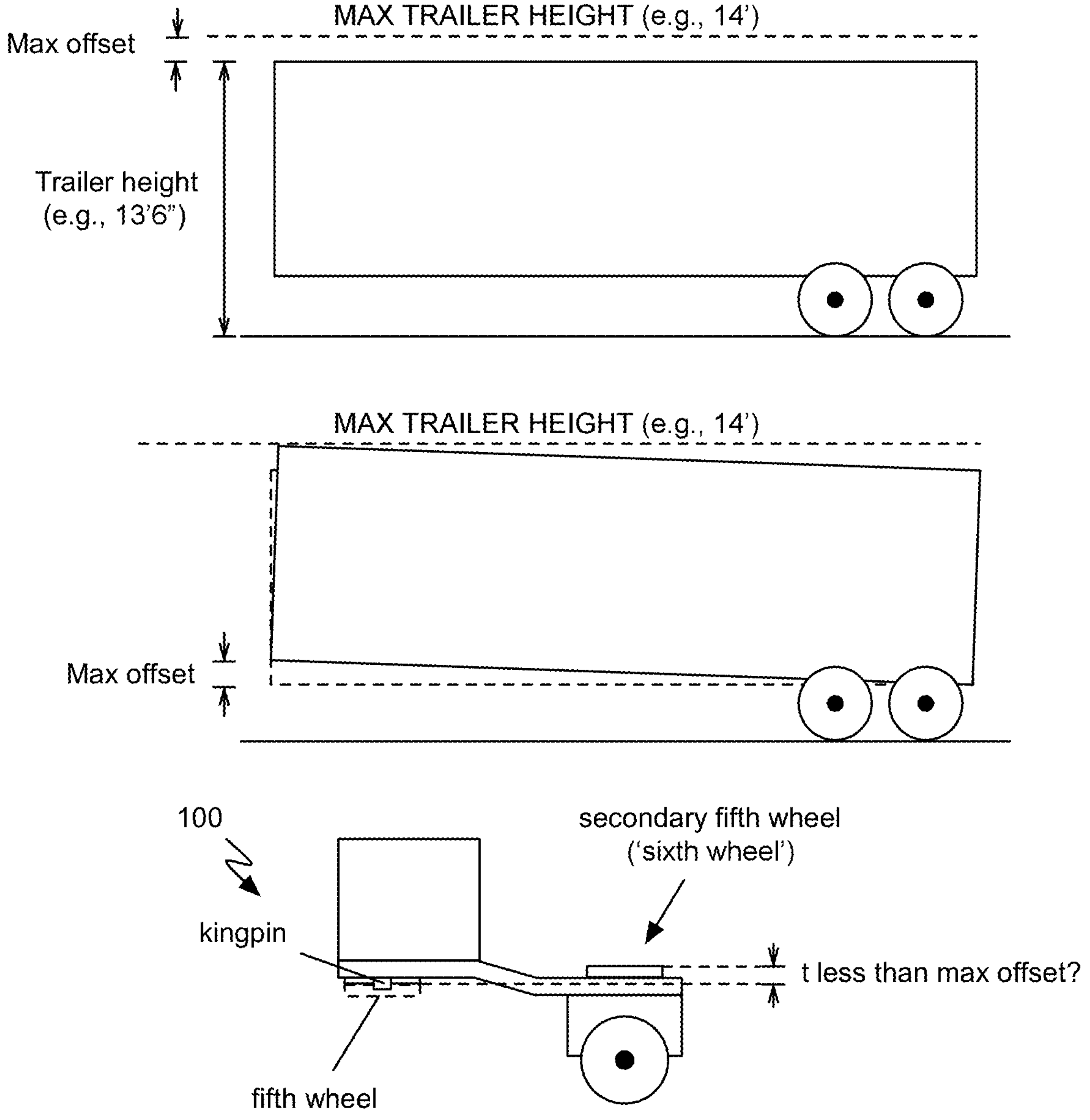
FIG. 6 is a diagrammatic example of a variant of the vehicle system.
Figure 10:
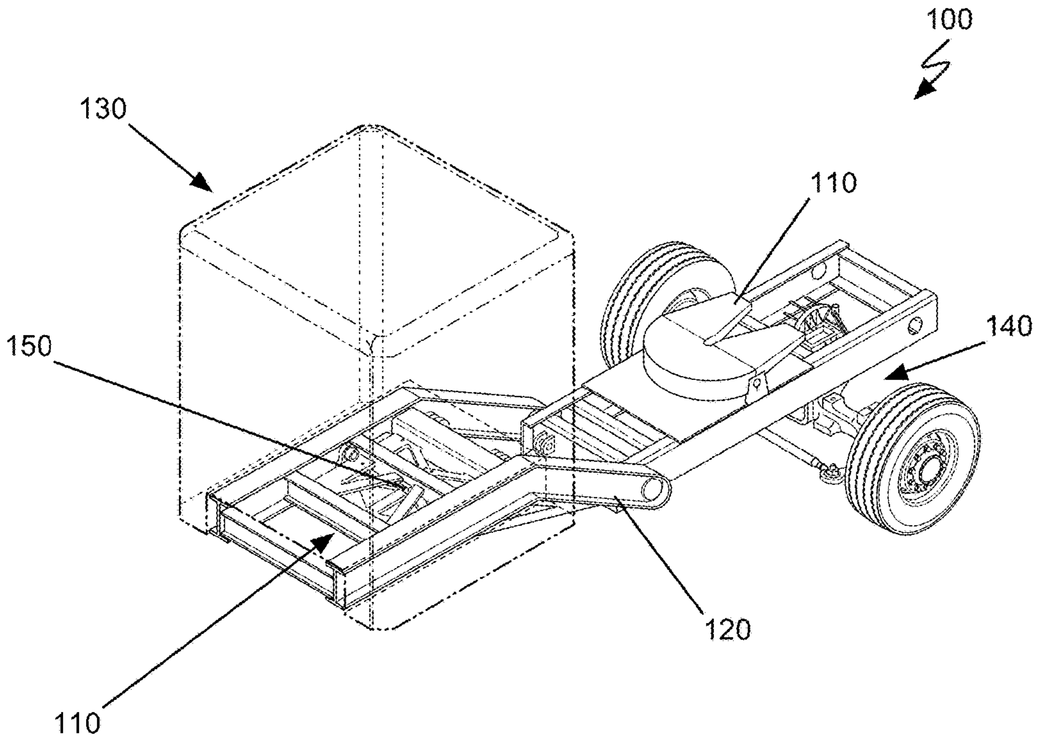
FIG. 10 is a partially transparent isometric view of a variant of a vehicle system
Figure 11:
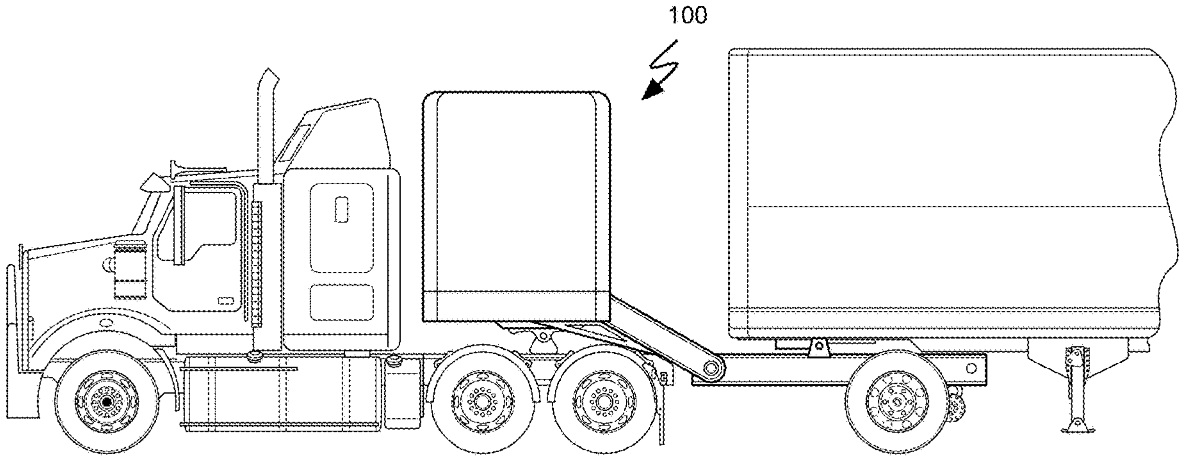
FIG. 11 is a side view of a variant of a vehicle system.

In variants, the thickness and/or geometry of the chassis between the tractor interface and the trailer interface can be set (e.g., at one or more lengthwise positions) based on the maximum vertical offset between the tractor interface and the trailer interface. In a specific example, the vertical offset between the tractor interface and the trailer interface can be less than six inches (e.g., in a vertical direction) at one or more lengthwise positions, which can minimize/reduce a trailer mounting angle (an example is shown in FIG. 6) and/or ensure compliance with a maximum trailer height threshold (e.g., clearance height of a bridge; as established by a regional/roadway regulatory body). The chassis thickness/geometry can be uniform along the length, and/or varied. The profile of the chassis (e.g., between the forward end and rearward ends relative to the longitudinal axis) can be straight, curved, stair-stepped, monocline-shaped, and/or otherwise configured. In a specific example, the chassis can include a pair of frame rails which are substantially symmetric about a midsagittal plane (e.g., an example is shown in FIG. 10; a second example is shown in FIG. 11), each frame rail including a first section which is substantially parallel to a longitudinal axis of the vehicle system proximal to a first vehicle coupling (e.g., at a forward/front end), a second section proximal to the second vehicle coupling (e.g., at a rear/trailing end) substantially parallel to the first section, and an intervening section between the first and second sections (e.g., connecting the first and second sections) which is angled or curved. Alternatively, the chassis can be a unibody chassis, or can be otherwise configured. However, the chassis can include any other suitable geometry/structure.

In variants, the chassis can be configured to house the batteries (e.g., the chassis can include an integrated battery enclosure, at an interior) and/or the powertrain/suspension, or can be configured to mount the batteries and/or powertrain, such as at an exterior of the chassis.

However, the vehicle system can include any other suitable chassis.

The vehicle system can include a battery pack 130, which functions to electrochemical energy in a rechargeable manner and/or functions to supply electrical energy to the electric powertrain 140. The battery pack can include a battery(ies) with lithium-based battery chemistry, such as: a lithium-ion battery, lithium cobalt oxide battery, a lithium ion manganese oxide battery, a lithium ion polymer battery, a lithium iron phosphate battery, a lithium-sulfur battery, a lithium-titanate battery, a thin film lithium ion battery, a lithium ceramic battery, and/or any other suitable lithium-based battery chemistry; or another chemistry (e.g., lower lifetime cost than Li-ion) such as NMC or LFP. However, the battery(ies) can include any other suitable chemistry for the storage and release of electrical energy. The electric vehicle can include: one battery pack per vehicle axle, one battery pack per motor controller, one battery pack per traction motor, a single battery pack for the electric vehicle, multiple (redundant) battery packs (e.g., 2 duplicative battery packs, more than 2, etc.) and/or any other suitable number of battery packs. In a specific example, there can be a single battery pack arranged vertically above the fifth wheel coupling at the tractor interface. In a second example, there can be a rear battery pack arranged proximal to a driven axle and/or below the sixth wheel (e.g., secondary fifth wheel coupling), which may provide increased traction at the wheels of the driven axle.

Figure 7:
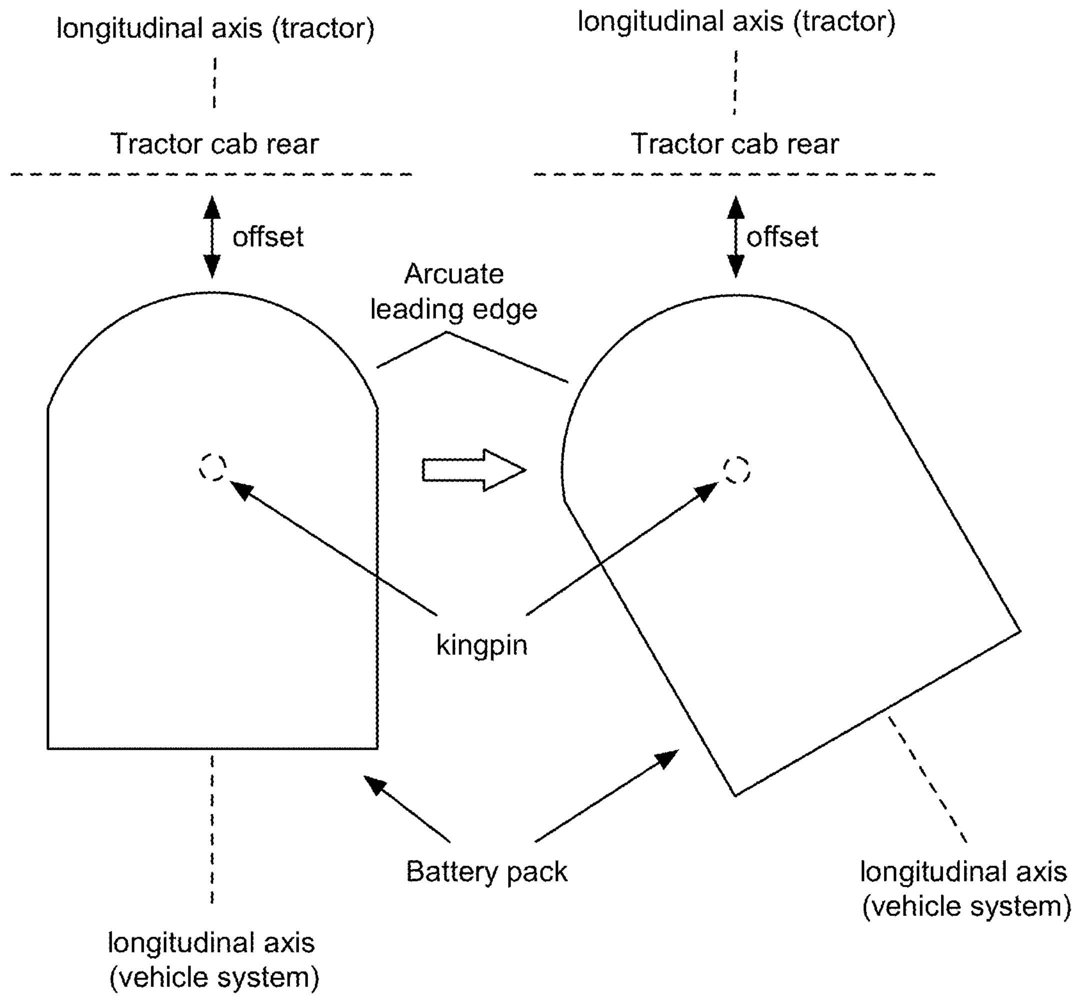
FIG. 7 is a diagrammatic example of a variant of the vehicle system.

In variants, the leading edge of the battery pack and/or chassis can be shaped to avoid mechanical contact/interference with the tractor during cornering and/or rotation at the tractor interface. In such cases, it can be advantageous for the leading edge of the battery pack to be arcuate, such as to maintain at least a minimum offset with the rear of the tractor cab (an example is shown in FIG. 7). In an example the cross-sectional geometry of the leading edge of the battery pack can have a substantially uniform radius about the axis of the kingpin. In variants, a width of the battery pack can be substantially similar to a standard trailer width and/or may have sides which are laterally offset from the sides of the trailer by less than a predetermined distance (e.g., 5 cm, 10 cm, 25 cm, 50 cm, etc.), which can minimize aerodynamic losses (e.g., pressure drag) of the vehicle. However, the battery pack can have any other suitable geometry, and/or can be otherwise suitably arranged.

The battery pack 130 can be any suitable size and/or configured to provide any suitable electric range. The battery pack can be less than 10 kWh, 10 kWh, 50 kWh, 100 kWh, 150 kWh, 200 kWh, 250 kWh, 300 kWh, 350 kWh, 500 kWh, greater than 500 kWh, any range bounded by the aforementioned values, and/or any other suitable size. The electric range of the battery pack (e.g., or effective electric range) can be less than 10 miles, 10 miles, 50 miles, 100 miles, 150 miles, 200 miles, 250 miles, 300 miles, greater than 300 miles, any range bounded by the aforementioned values, and/or any other suitable electric range.

The battery pack 130 can include or be used with a charge port of the vehicle system can facilitate battery charging/recharging from a remote power input (e.g., AC power, DC power, combined AC/DC, 120V, 240V, 480V, etc.; via remote vehicle charging infrastructure, etc.). However, the battery pack can additionally or alternatively be charged by regenerative braking at the traction motor of the electric powertrain (e.g., harvesting kinetic energy from the vehicle system and/or vehicle connected thereto), and/or can be otherwise suitably charged/configured.

In variants, the battery pack 130 can include a set of battery cells which is arranged above a front vehicle coupling (e.g., at a front end of the vehicle relative to the longitudinal axis; tractor interface; kingpin; etc.) and extends longitudinally forward vehicle coupling relative to the longitudinal axis. However, the battery pack and/or battery cells can additionally or alternatively be distributed: within the chassis, beneath the chassis, beneath a rear vehicle coupling (e.g., trailer interface; secondary fifth wheel; etc.), outboard of the chassis, and/or can be otherwise suitably distributed.

In some variants, the upper end of the battery pack (e.g., maximum battery height) is between 6 feet and 13.5 feet above a ground plane, which may facilitate large battery pack volume and/or can reduce the size (e.g., total volume) of the air gap between a connected tractor and trailer in one or more configurations. However, batteries can be mounted in any other suitable arrangement.

However, the vehicle system can include any other suitable battery pack.

The vehicle system can include an electric powertrain 140, which functions to generate electromotive force at the traction motor(s) and to convert this force into torque at the wheels. The electric powertrain can include: a traction motor, a transmission, a set of wheels. The electric powertrain can optionally include frictional brakes. However, the vehicle system can include any other suitable powertrain.

The electric powertrain 140 can include a single traction motor or multiple traction motors: per wheel (or hub), per axle, per chassis, and/or with any other suitable number of traction motors. The traction motor(s) can include: an AC motor, DC motor (e.g., BLDC), inrunner motor, outrunner motor, synchronous motor, axial flux motor, asynchronous motor, brushed motor, brushless motor, and/or any other suitable type of traction motor. The power specification (peak, continuous, etc.) of the traction motor(s) can be: less than 50 kW, 100 kW, 150 kW, 200 kW, 250 kW, 300 kW, 600 kW, 900 kW, greater than 900 kW, any range bounded by the aforementioned, and/or any other suitable power. The traction motor torque specification (e.g., peak, continuous, etc.) can be: less than 100 Nm, 100 Nm, 300 Nm, 500 Nm, 800 Nm, 1000 Nm, 1200 Nm, 1500 Nm, greater than 1500 Nm, any range bounded by the aforementioned value, and/or any other suitable motor torque specification. However, the vehicle system can include any other suitable motor(s) with any suitable torque/speed characteristics.

The electric powertrain 140 can include and/or be used with one or more axles of the vehicle system, which can include: beam axles, solid axles (e.g., spanning between the wheels and rigidly connecting the wheels, rigid), floating axles (e.g., full-floating, semi-floating, three-quarter floating), split axles (e.g., two half shafts), transaxles (e.g., with an integrated transmission and/or differential), live axle, dead axle, steering axles, stub/stud axles, lift axles, actuatable axles (e.g., steering axle; as an automotive front axle; via an axle actuator, etc.); configured an automotive rear axle, floating axle, driving middle axle; and/or can include any other suitable axle(s). Axles can be mounted to the suspension in any suitable suspension configuration, and may likewise include wheel/hub bearings in any suitable configuration. Axles can be configured to rotate with the wheels (e.g., transmitting forces and/or moments between the wheels, transmitting forces and/or moments between powertrain components and one or more wheels) and/or can be static (for floating axles).

In a first variant, a split axle can include two half shafts, each half shaft connected by a CV-joint to a motor at an inboard end and a wheel (and hub) at an outboard end. In a first example, a single motor can be connected to both half shafts (e.g., by a transmission which may include a differential). In a second example, there can be independent motors connected to each half shaft (e.g., direct drive, planetary drive, etc.)

In a second variant, the axle can include an integrated motor(s) which can be suspended/sprung (e.g., integrated into a beam axle; coaxial motor; etc.), un-sprung (e.g., hub motors, moving up and translating with a hub and/or wheel end, etc), integrated inboard or outboard of the suspension, and/or otherwise interconnected to the left and right wheel ends.

In a specific example, the vehicle system can include a steering drive axle with an integrated traction motor.

Figure 13:
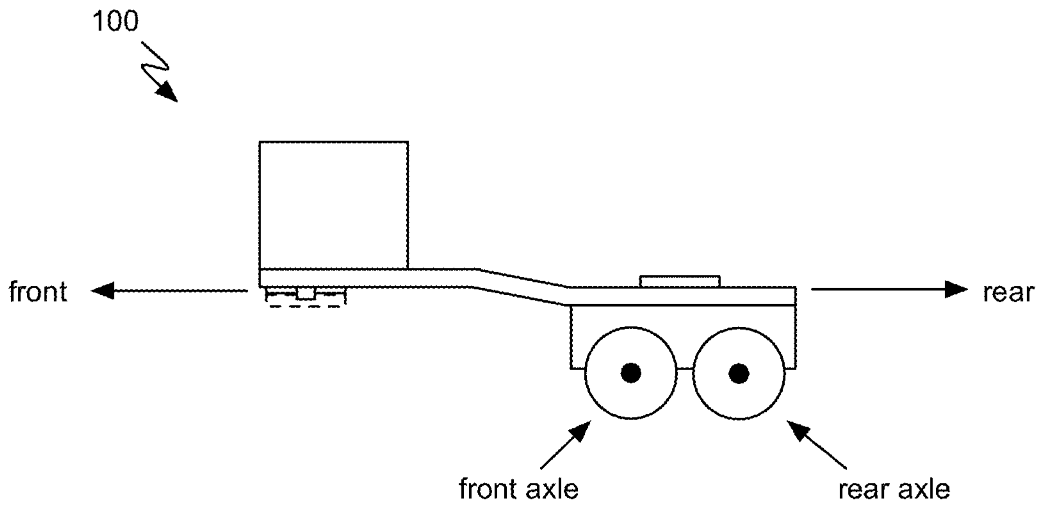
FIG. 13 is a schematic representation of a variant of the vehicle system.
Figure 14F:
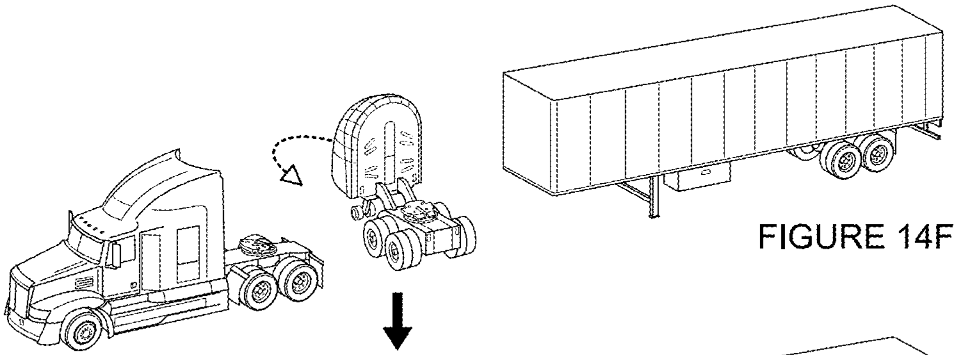
Figure 14G:
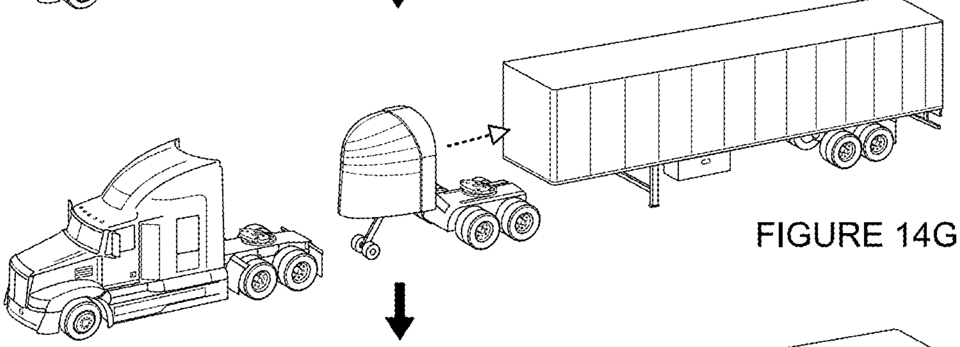
Figure 14H:
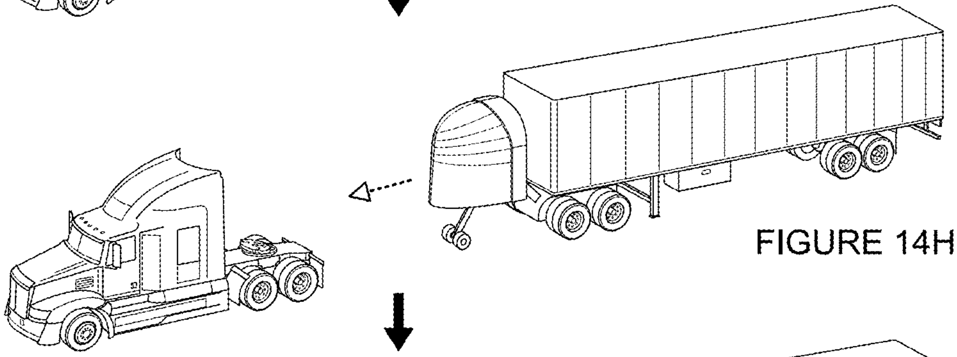
Figure 14I:
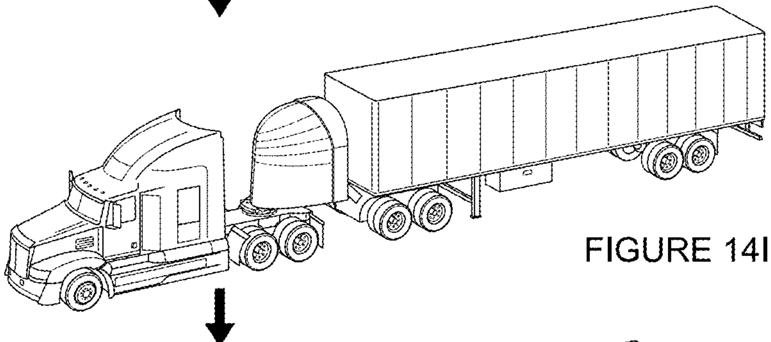
Figure 14J:
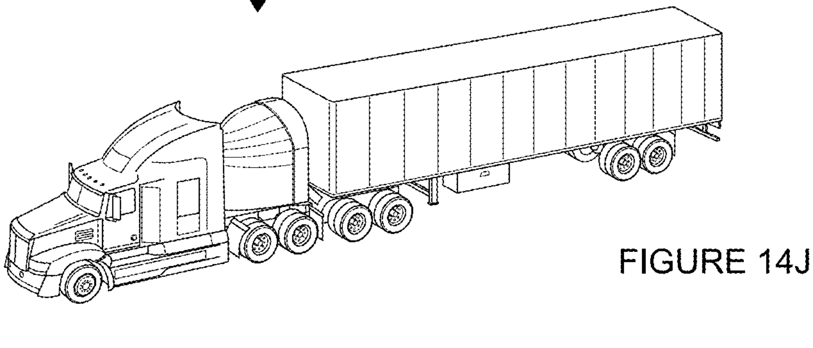

In variants, the vehicle system can include exactly one axle (e.g., which may advantageously reduce the overall length of the vehicle system and/or the cost of the vehicle system). Alternatively, the vehicle system can include multiple (e.g., two) axles, which can be of the same or different type (e.g., front driving, rear floating/driven), an example of which is shown in FIG. 13. In variants, one or more axles can include an axle lift (e.g., a 'driving lift axle', a non-powered lift axle, etc.). In variants, one or more axles can be steerable and/or the vehicle can include axle actuation mechanisms.

The axle is preferably a high-load axle, having an axle load capacity in excess of 17 k lbs. In a first variant, the axle is configured to support at least 24 k lbs. In a second variant, the axle is configured to support at least 30 k lbs. However, the axle can be otherwise configured and/or have any suitable axle load capacity (e.g., 17 k lbs, less than 17 k lbs, etc.).

In one set of variants, the vehicle system includes a set of axles, the set of axles comprising a steering axle, wherein each axle of the set defines a respective axle load, wherein the sum of the respective axle loads defines a total weight bearing of the road vehicle system, wherein the respective axle load of the steering axle is greater than 70% of the total weight bearing of the road vehicle system in a (roadway) driving configuration (e.g., 100% of load transmitted from the vehicle system directly to the road). In a first example, the steering axle is a high-load axle, wherein, in the driving configuration, the respective axle load of the steering axle is greater than 17,000 pounds. In a second example, the vehicle system further includes a lift axle mounted to the chassis forward of the steering axle relative to the longitudinal axis (e.g., landing gear axle), wherein the lift axle is unloaded in the driving configuration, wherein the respective axle load of the steering axle is greater than 70% of the total weight bearing of the road vehicle system in a second configuration (e.g., with the landing gear retracted).

In a first example, the set of axles can include exactly one roadway axle (e.g., which can be a drive axle and/or steering axle). In a second example, the set of axles can include a plurality of roadway axles (e.g., two; a drive axle and a steering axle; etc.). In a third example, roadway axles in the first and second examples can operate in conjunction with a landing gear axle (e.g., in a low speed setting, such as during yard operations).

However, the vehicle can include any other suitable set of axles.

The system can include or be configured to operate with a single wheel on each end of an axle (e.g., 'super singles'), dual wheels (e.g., two per hub; 'dualies'), and/or there can be any other suitable wheel configuration(s). The wheels and/or tires are preferably sized to match the tractor and/or trailer wheels (e.g., 22.5"), but can alternatively be different (e.g., 19.5 inches, etc.). However, the powertrain can include (or be connected to) any suitable set(s) of wheels.

The transmission functions to connect the traction motor (s) to the wheels in any suitable power-transmitting scheme. The transmission can include any suitable gear reductions by way of a gearbox mechanism (e.g., helical gear set, planetary, etc.)—providing a static and/or selectively variable gear reduction between the rotation of the motor and the rotation of the drive axle/wheels. In a specific example, the gearbox can be a single-speed gearbox with a gear ratio of: 1:1 (direct drive, no gear reduction), 2:1, 3:1, 4:1, 5:1, 6:1, 8:1, 10:1, greater than 10:1, any range bounded by the aforementioned ratios, and/or any other suitable gear ratio. The gearbox can be optimized for performance at highway speeds (e.g., about 60-65 miles per hour), or can be otherwise configured.

In variants, the transmission can optionally include a differential and/or a clutch.

In variants, the motor can be integrated into a wheel hub, integrated into an axle, connected to one or more axles by the transmission, and/or can be otherwise suitably integrated.

The transmission and/or powertrain is preferably configured to independently and/or separately rotate of the left and right wheels (and/or wheel rotors), however the wheels can additionally or alternatively be mechanically linked and/or actuated by a single mechanism or mechanical connection.

The electric powertrain 140 can optionally include a set of frictional brakes, which function to frictionally dissipate the kinetic energy of the vehicle system (e.g., slowing a tractor and/or trailer connected thereto). The frictional brakes are preferably electrically controlled (e.g., by an electronic braking system or 'EBS'; by the vehicle controller; in a drive-by-wire configuration; etc.), but can additionally or alternatively be controlled by a pneumatic or hydraulic control signal. The frictional brakes can be operated by a pneumatic, hydraulic, and/or electromechanical (linear and/or rotational) actuation. In variants, the frictional brakes are controlled by the controller, but can additionally or alternatively be controlled by the tractor and/or vehicle operator—such as by a parking brake pneumatic/air line, dynamic brake pneumatic/air line, and/or electrical control signal from the cabin. The frictional brakes preferably include disc brakes and/or brake calipers, but can additionally or alternatively include a drum brake, clasp brake, band brake, and/or any other suitable type of frictional brake. Alternatively, the vehicle system can altogether exclude frictional brakes (e.g., relying entirely on regenerative braking and/or tractor/trailer brakes).

In variants, the vehicle system can include a pneumatic brake line passthrough configured to fluidly couple a tractor brake line to a trailer brake line (e.g., at opposing ends; at a front/rear of the vehicle, etc.). In a specific example, the sensor suite can include a brake line sensor coupled to the pneumatic brake line passthrough, which can allow the controller to dynamically react to vehicle braking.

However, the system can include any other suitable powertrain.

The vehicle system can optionally include a suspension 180, which functions to suspend the chassis relative to the wheels, axles (e.g., axle hubs), and/or un-sprung vehicle components. Additionally or alternatively, the suspension functions to absorb shock and/or impact loads. In variants, the suspension (e.g., air spring suspension) can additionally or alternatively function to raise and/or lower a height of the secondary fifth wheel ('sixth wheel'), which may be used to selectively engage and/or jack up the front end of a trailer (e.g., while the trailer is supported by its respective landing gear). The suspension can include any suitable combination and/or permutation of spring elements, damping elements, and/or any other suitable suspension elements (e.g., tie rods, push rods, linkages, etc.).

The suspension is preferably an independent suspension (e.g., swing axle, sliding pillar, MacPherson strut, Chapman strut, double wishbone, multi-link, trailing arm, semi-trailing arm, swinging arm, etc.), but can alternatively be a semi-independent suspension, dependent suspension (e.g., including any suitable linkage, such as: Statchell link, Panhard rod, Watt's linkage, WOBlink, Mumford linkage, lateral leaf springs, longitudinal leaf springs, etc.), and/or any other suitable type of suspension. The suspension can be passive, adaptive/semi-active (e.g., active damping, etc.), active suspension, and/or any other suitable type of suspension. The suspension can optionally include an anti-roll bar (e.g., active, passive, etc.) and/or altogether exclude anti-roll bars. Spring elements of the suspension can include: air springs (e.g., air bellows, electronically controlled air suspension), coil springs, leaf springs, and/or any other suitable spring elements. The suspension can include telescopic dampers, strut insert dampers, lever arm dampers, and/or any other suitable damping elements. Damping elements can be hydraulic/oil-filled, pneumatic, rubber, and/or of other suitable construction.

However, the vehicle system can include any other suitable suspension.

The sensor suite 150 functions to monitor vehicle state parameters which can be used for vehicle control (e.g., autonomous vehicle control, powertrain control). The sensor suite can include: fifth/sixth wheel instrumentation stage sensors (e.g., force sensors such as load cells, strain gauges, etc.), internal sensors (e.g., force sensors, accelerometers, magnetometer, gyroscopes, IMU, INS, temperature, voltage/current sensors, etc.), force sensors (e.g., strain gauge, load cells, capacitive force sensors, inductive force sensors, force transducers, piezoelectric sensors, embedded force sensors, load pins, etc.), diagnostic sensors (e.g., cooling sensors such as: pressure, flow-rate, temperature, etc.; BMS sensors; tractor/trailer inter-connection sensors or passthrough monitoring, etc.), location sensors (e.g., GPS, GNSS, triangulation, trilateration, etc.), wheel encoders, cameras, temperature sensors, voltage/current sensors, environmental sensors (e.g., cameras, temperature, wind speed/direction, barometers, air flow meters), guidance sensors (e.g., sonar, lidar, radar, cameras, etc.), cameras (e.g., CCD, CMOS, multi-spectral, visual range, hyperspectral, stereoscopic, etc.), spatial sensors, touch sensors (e.g., resistive, capacitive, etc.), proximity sensors, and/or any other suitable sensors. However, the vehicle system can include any other suitable sensors.

Figure 8A:
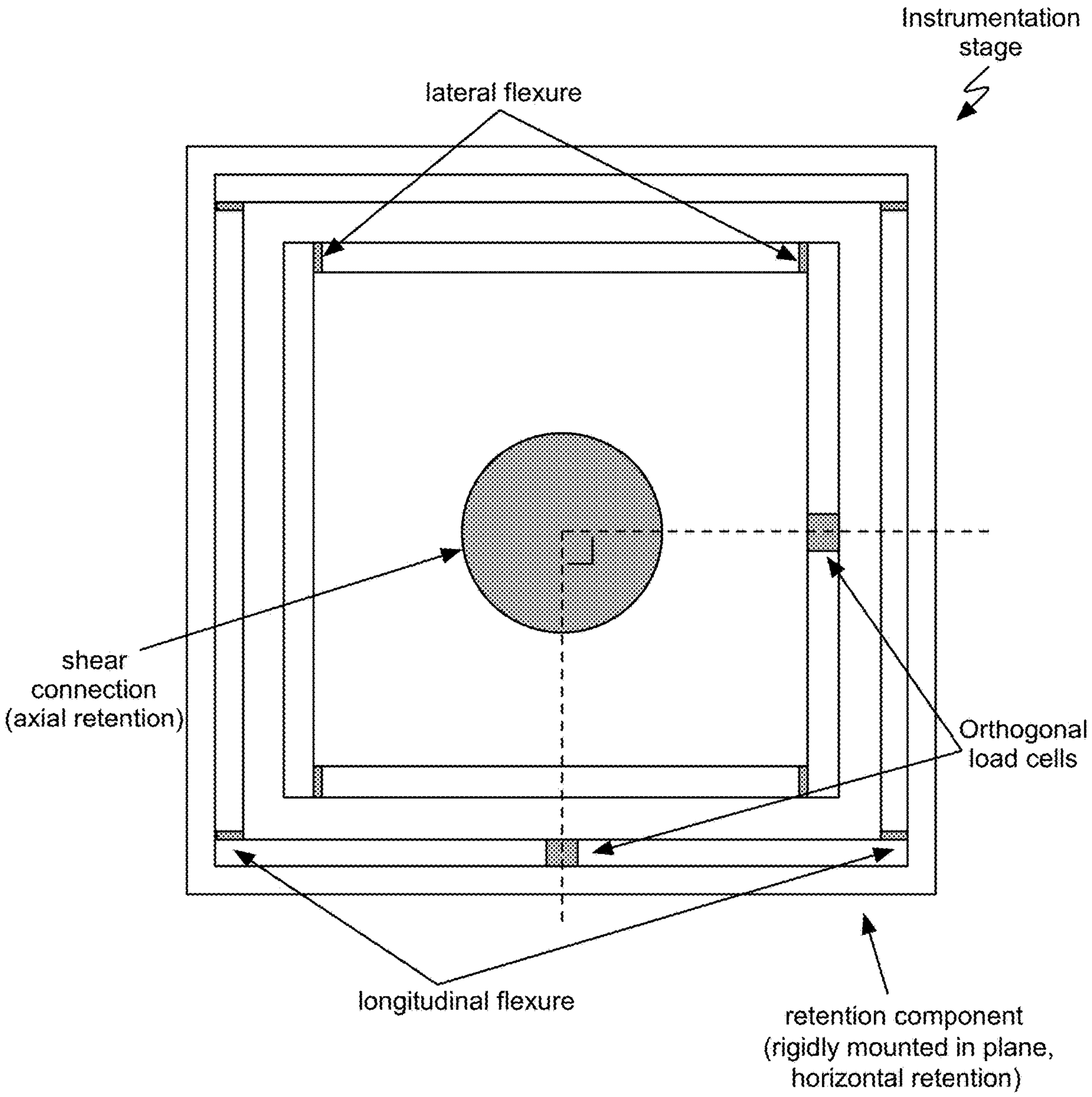
FIG. 8A is a cross-sectional schematic of a variant of an instrumentation stage in a variant of the vehicle system.
Figure 8B:
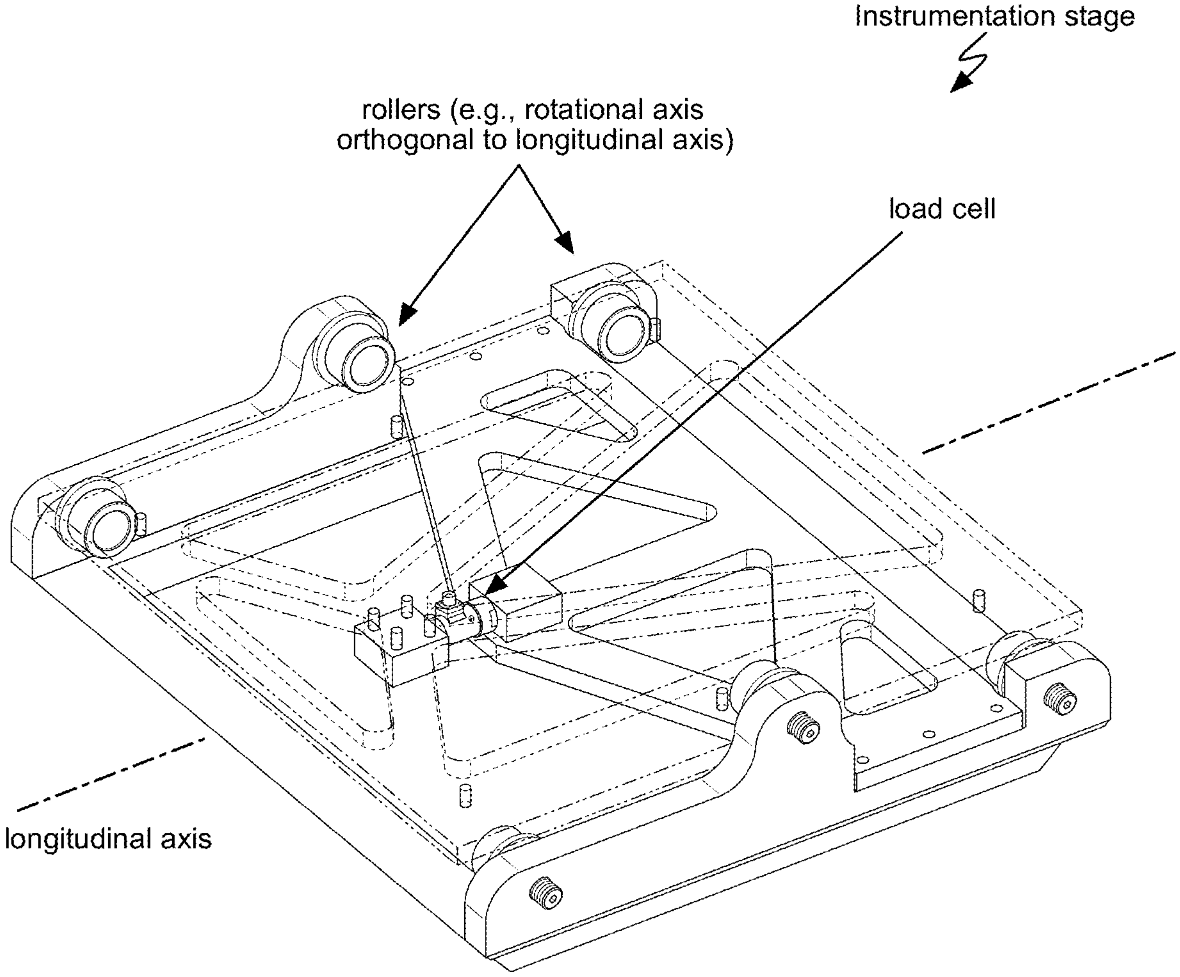
FIG. 8B is a partially transparent isometric view of a variant of an instrumentation stage in a variant of the vehicle system.

In variants, the tractor and/or trailer interfaces can include an instrumentation stage (examples are shown in FIGS. 8A-B) between the fifth wheel coupling (e.g., tractor side, trailer side) and the chassis which houses load sensors of the sensor suite. Preferably, there is an instrumentation stage connected to at least one of the tractor and trailer interfaces, but the vehicle system can additionally or alternatively include an instrumentation stage at both interfaces and/or altogether neglect an instrumentation stage within the vehicle system (e.g., in variants where control relies primarily upon control inputs from the tractor).

The instrumentation stage functions to measure force transmission between components engaged at the interface (e.g., force transmission across the fifth wheel coupling; longitudinal force transmission aligned with a longitudinal vehicle axis; multi-axis force sensing). The instrumentation stage can include lateral force sensors, longitudinal force sensors, vertical force sensors, flexures (e.g., isolating force transmitted to the load cell along a single axis; longitudinal flexures, lateral flexures; longitudinal stiffening elements, lateral stiffening elements, etc.), damping elements, rollers (e.g., lateral axis, longitudinal axis, etc.), and/or any other suitable components.

In a first example, the instrumentation stage can include a shear connection at an interior of the stage, and a horizontal retention component encircling the shear connection in a horizontal plane. A force sensor (e.g., load cell, strain gauge, force-torque sensor, etc.) can be arranged between the horizontal retention component and the shear connection and configured to measure (shear) forces transmitted in a first (horizontal) direction. A first set of stiffening elements or flexure elements can be arranged between the shear connection and the horizontal retention component and configured to provide stiffness orthogonal to the first direction (e.g., isolating force transmitted to the load sensor in the first direction). The stage can optionally include a second horizontal retention component encircling the first, along with a second load sensor which is orthogonal to the first and a corresponding set of stiffening elements (e.g., providing stiffening in the first direction; orthogonal flexures).

In a second example, the sensor instrumentation stage substantially isolates force transmission through a first sensor along a longitudinal axis with a flexure (an example is shown in FIG. 8A) or set of orthogonal rollers (an example is shown in FIG. 8B).

In a third example, sensors can be integrated into the body of the kingpin (and/or a kingpin assembly as part of the instrumentation stage). For instance, multi-axis force sensing (e.g., longitudinal, lateral, vertical, etc.; 2-axis force sensing in a sagittal plane; 3-axis force sensing; etc.) and/or any other suitable sensors of the sensor suite (e.g., IMU, etc.) can be integrated into a sensory kingpin as an element of the sensor suite.

In variants, the instrumentation stage can altogether exclude damping elements, or can include damping elements aligned with and/or orthogonal to stiffening elements and/or load sensors.

Additionally or alternatively, instrumentation stages can include integrated inertial sensors (e.g., IMUs, etc.), force sensors (e.g., strain gauge, load cells, capacitive force sensors, inductive force sensors, force transducers, piezoelectric sensors, embedded force sensors, load pins, etc.), angular position/velocity sensors (e.g., configured to measure a relative angle between two sides of a fifth wheel coupling at the tractor/trailer interface), and/or any other suitable sensors. For example, vertical force sensing (e.g., Z-axis; perpendicular to longitudinal axis of chassis in sagittal plane) can be integrated into the instrumentation stage (e.g., within the rigid mounting structure of the kingpin and/or vertical load path).

In some variants, multi-axis force sensing (e.g., three axis force sensing; orthogonal sensing in the midsagittal plane) can be fused to estimate longitudinal forces to facilitate vehicle control, such as by the systems and/or methods as described in U.S. application Ser. No. 18/592,063, filed 29 Feb. 2024, titled "VEHICLE SYSTEM AND LONGITUDINAL VEHICLE CONTROL METHOD", which is incorporated herein in its entirety by this reference. As an example, Z-axis force sensing (e.g., aligned with axis of the kingpin) can be used to filter if dynamic responses and/or tonnage weight (e.g., trailer load, etc.) to remove force contributions from longitudinal forces. As a second example, multi-axis force sensing (e.g., 3 axis force sensing) can be used to remove lateral and/or vertical influences from force estimation during cornering (e.g., where longitudinal axes within a combination vehicle are necessarily misaligned).

However, the vehicle system can include any other suitable sensor suite.

The vehicle system can include a controller 160 which functions to distribute power within the vehicle system and/or control the electric powertrain. The controller can additionally or alternatively function to implement autonomous vehicle controls (e.g., automatic regenerative braking). The controller can include a battery management system (BMS), motor controller (or motor inverter), and/or any other suitable components. The controller can receive sensory inputs/measurements from the sensor suite, which can be used to determine a vehicle state, dynamically control the vehicle system, manage the batteries, and/or control the electric powertrain. The controller can be centralized (e.g., packaged within the chassis and/or mounted thereto; within a single module) or distributed (e.g., across multiple compute nodes, packaged within multiple compute modules, etc.). The controller is preferably communicatively coupled to each sensor of the vehicle sensor suite and configured to autonomously control the electric powertrain based on measurements from each sensor of the vehicle sensor suite. In a first example, the controller can autonomously control the traction motor (e.g., torque, speed, etc.) based on the longitudinal force (and/or lateral force) measured at the instrumentation stage. In a second example, the controller can autonomously determine steering controls (e.g., for a steering drive axle, etc.) based on the measurements (e.g., longitudinal force, lateral force, etc.) from the instrumentation stage.

The controller can include a battery management system which functions to monitor the battery state, which can include: state of charge (SoC), state of health (SoH), state of power (SoP), state of safety (SoS), temperature (e.g., of the battery or a set of cells therein, a temperature distribution of battery cells, etc.; cooling temperature), and/or any other suitable characteristics. The battery management system can also function to control the charging (e.g., via a charge port;

during regenerative braking) and/or discharging (via the electric powertrain) of the battery. However, the controller can include any other suitable BMS.

The controller can include one or more motor controllers which function to condition power from the battery to be supplied to a traction motor and/or to control electrical propulsion and/or dynamic (regenerative) braking at the traction motor. There can be a single motor controller associated with the vehicle, one motor controller per motor, and/or any other suitable number of motor controllers. However, the controller can include any other suitable motor controllers.

However, the vehicle system can include any other suitable controller.

Figure 5:
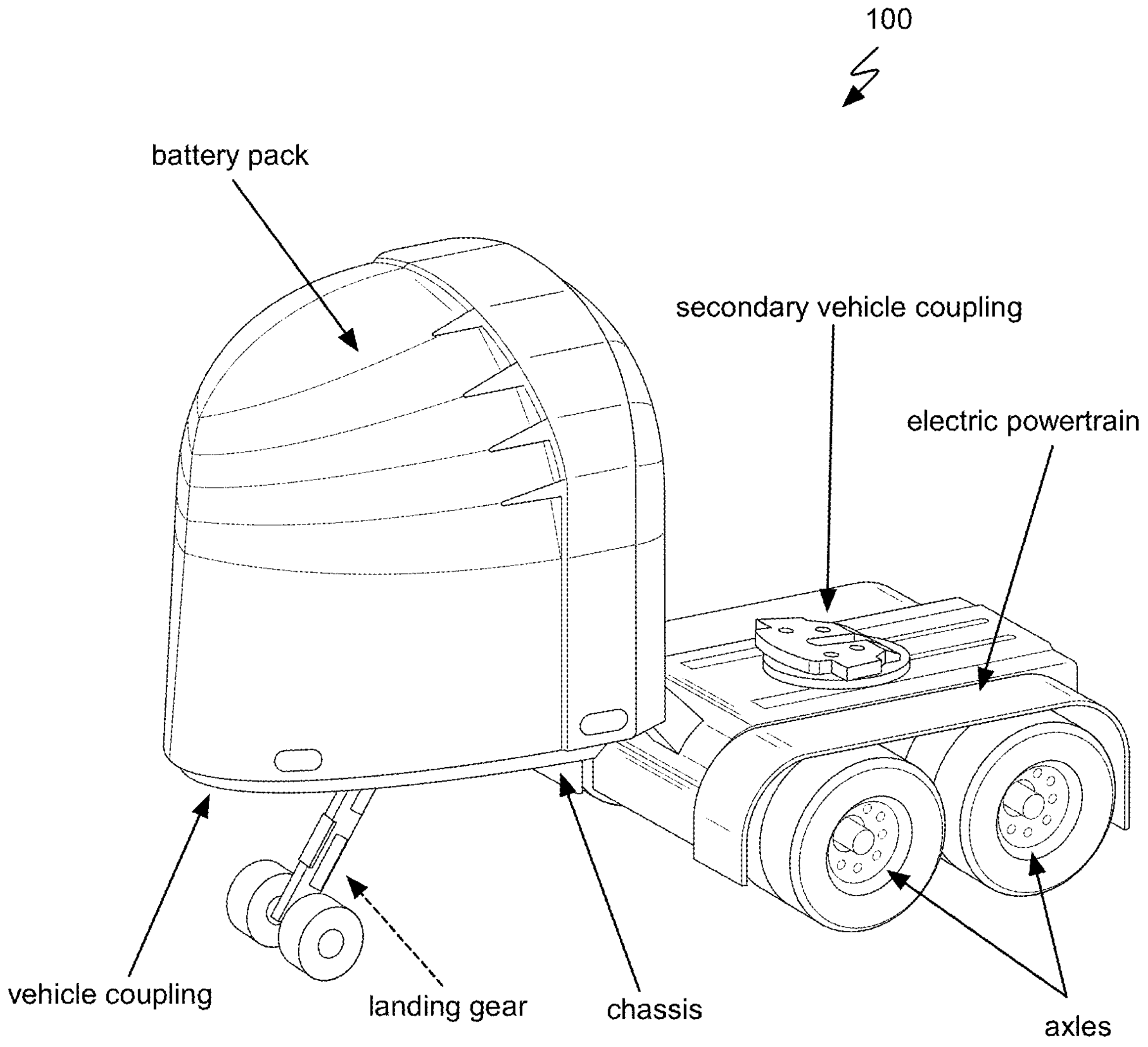
FIG. 5 is an isometric view example of a variant of the vehicle system.

The vehicle system can optionally include landing gear 170 (an example is shown in FIG. 5), which functions to stabilize the vehicle system when it is decoupled from a tractor (and/or trailer). The landing gear can be fixed or extendable/retractable; retractable landing gear can be deployed telescopically, linearly, rotationally, actively (e.g., electromechanically, pneumatically, etc.), passively (e.g., spring biased towards ground which is retracted by the engagement at the fifth wheel coupling, bistable spring system, etc.), manually (e.g., by a vehicle driver/operator, locked in a deployed and/or retracted configuration), and/or can be otherwise suitably deployed. The landing gear is preferably arranged forward of the axle(s) such that the contact surface(s) of the landing gear (e.g., wheel, roller, caster, foot, etc.) and the wheels cooperatively stabilize the vehicle system about the center of mass (e.g., forming a triangle or polygon which encloses a planar projection of the center of mass). In a specific example, the landing gear can deploy substantially below the kingpin of the tractor interface. In a second example, the landing gear can be stowed below the battery pack and/or within a cavity of the chassis while the vehicle system is connected to a tractor. In variants, the landing gear can be jacking (e.g., configured to adjust a height of the battery pack and/or fifth wheel coupling/kingpin) or non-jacking (e.g., stabilizing, static, lockable, etc.).

Figure 12:
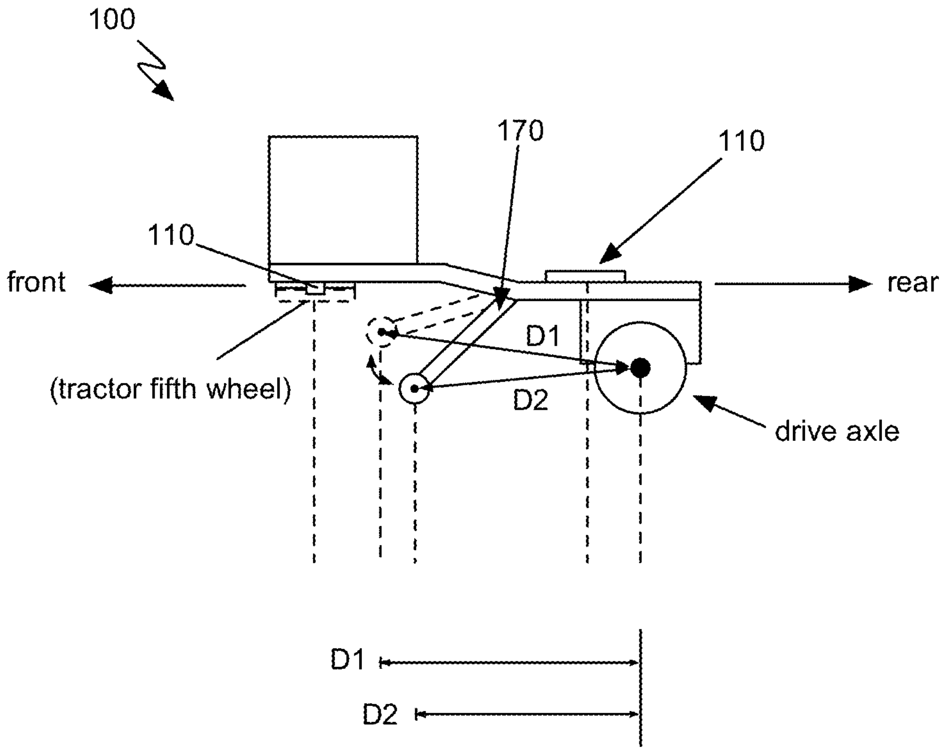
FIG. 12 is a schematic representation of a variant of the vehicle system.

In variants, the landing gear can include a set of axles (e.g., a forwardmost axle relative to the longitudinal axis; front axle; lift axle; etc.) which can be transformed via a landing gear actuation mechanism between an extended/deployed configuration and a retracted configuration. In such variants, with the landing gear extended, the roadway EV system can be a rear-wheel drive and/or rear-wheel steering vehicle. Additionally or alternatively, the distance between the front axle and the drive axle changes between the extended and retracted configurations of the landing gear (e.g., which may facilitate satisfaction of spatial and/or stability constraints; an example is shown in FIG. 12). For example, the landing gear can transform a front axle longitudinally (e.g., by rotation, in addition to vertically, etc.; forwards, rearwards, etc.) between a first configuration (e.g., retracted configuration) and second configuration (e.g., extended configuration).

In variants, the landing gear can be configured to support any suitable load and/or proportion of the total weight bearing of the vehicle. For example, in the deployed configuration, the landing gear axle(s) can support greater than 50% of the vehicle weight, less than 50% of the vehicle weight, 30% of the total weight bearing, less than 30% of the total weight bearing, can be loaded/unloaded, and/or can otherwise support the vehicle system. In a first example, with the landing gear extended and the vehicle system decoupled from a tractor and a trailer, the landing gear can support a majority of the weight of the batteries. In a second example, with the landing gear extended and the vehicle system coupled to a trailer, the drive axle can support a majority of the load imparted by the trailer at the secondary fifth wheel. In a third example, the load can be substantially balanced between the landing gear and the drive axle(s).

However, the vehicle system can include any other suitable landing gear.

The vehicle system can optionally include a cooling system, which functions to reject thermal energy from the battery pack, traction motor, motor controller, and/or any heat-generating components (e.g., electronics, such as a DC-DC converter). The cooling system can be active (e.g., pumping a working fluid or refrigerant through one or more fluid loops) or passive (e.g., relying on airflow across passive heat sinks). Active cooling can include super-ambient cooling (e.g., rejecting heat by airflow through a radiator or other heat exchanger; where the working fluid is substantially incompressible, such as: oil, water, water/glycol, etc.) and/or sub-ambient cooling (e.g., utilizing a refrigeration cycle).

In a first variant, the cooling system can include a super-ambient cooling loop, which includes a liquid working fluid (e.g., oil, water/glycol) which is circulated through a radiator (or set of radiators, such as a pair of radiators respectively mounted at the front and rear) or other liquid-air type heat exchanger.

In a second variant, the cooling system can include a sub-ambient loop which is thermally connected to the battery pack, wherein the working fluid of the sub-ambient loop is configured to remain below ambient temperature (e.g., by way of a refrigeration cycle and/or a separate refrigerant loop).

In a third variant, the battery can be thermally decoupled from the cooling subsystem and/or rely on passive conduction and/or air convection to dissipate battery heat.

The batteries, traction motor, and/or motor controller can be cooled by the same cooling system(s) and/or components in any suitable combination and/or permutation of series/parallel, or can be separately cooled by isolated and/or distinct cooling systems.

However, the electric vehicle can include any other suitable cooling subsystem, or can otherwise exclude (active) cooling systems.

In variants, the vehicle system can optionally include an air compressor and/or an air reservoir, which function to supply pneumatic pressure to an air suspension, pneumatic (frictional) brakes, and/or an attached trailer. Additionally or alternatively, the vehicle system can utilize a pneumatic source from the tractor, or be otherwise suitably configured.

In variants, the vehicle system can be coupled to a parking brake pneumatic line, dynamic brake pneumatic line, and/or electrical line of the tractor and/or trailer. In a first variant, the vehicle system can include passthrough connections for each tractor/trailer inter-connection. In a second variant, the controller of the vehicle system can selectively boost or decrease one or more passthrough signals (e.g., braking signals) and/or tractor trailer interconnections. In a third variant, the controller can fully decouple interconnections between the tractor and the trailer (e.g., acting as an intermediary or otherwise superseding tractor control inputs). In a fourth variant, one or more tractor/trailer inter-connections can be unused or eliminated (e.g., pneumatic line, electronic signal). As an example, the compressor and/or controller onboard the vehicle system 100 can be used to command all actuators on the vehicle system and/or trailer (e.g., brakes, lift mechanisms, etc.).

In variants, the secondary fifth wheel coupling can be selectively and/or automatically detachable (e.g., by electromechanical or pneumatic actuation, shear pin actuation for roll angle in excess of a threshold, etc.), which can allow a trailer connection to be jettisoned in an emergency event (e.g., in response to the controller detecting a vehicle/trailer roll in excess of a predetermined threshold; if the vehicle will imminently tip; etc.).

However, the vehicle system can include any other suitable components.

4. Example Configurations

In a first configuration (an example is shown in FIG. 9A) of a variant of the vehicle system, the vehicle system can be connected to a trailer at a fifth wheel coupling (e.g., the secondary fifth wheel coupling; sixth wheel). In the first configuration, the battery pack can be arranged: forward of the trailer kingpin, forward of a front plane of the trailer, above a base plane of the trailer payload (e.g., cargo container); an example is shown in FIG. 11, partially or entirely above a top of a trailer wheel, offset forwards of a leading edge of the trailer, vertically above a trailer kingpin of the trailer, and/or otherwise suitably arranged relative to the trailer. In the first configuration, the powertrain and/or an axle of the vehicle system can be arranged: beneath the trailer (e.g., proximal a trailer kingpin), ahead of a leading edge of the trailer, rearward of a leading edge of the trailer, ahead of the trailer landing gear, on an opposing side of a front plane of the trailer relative to the battery pack, on an opposing side of a payload base plane of the trailer relative to the battery pack, and/or otherwise suitably arranged. In the first configuration, landing gear can be deployed or retracted. In an example of the first configuration, the battery pack can be partially or fully cantilevered (e.g., ahead of a chassis mounting point of the landing gear, ahead of the secondary fifth wheel, etc.). In the first configuration, the powertrain can supply propulsion to the trailer, such as during yard operations and/or during connection to the tractor.

In a second configuration (an example is shown in FIG. 9B) of a variant of the vehicle system, the vehicle system can be connected to a tractor with a fifth wheel coupling (e.g., at a kingpin of the vehicle system). In the second configuration, the battery pack and/or front portion of the chassis can be arranged vertically above the rear wheel(s) of the tractor (e.g., directly above, above from a side view projection), above the fifth wheel of the tractor, and/or otherwise suitably arranged relative to the tractor. In the second configuration, the electric powertrain and/or axle of the vehicle system can be arranged between the rear axle of the tractor and the front axle of the first (payload) trailer.

In variants, the vehicle system can be transitioned between configurations (e.g., examples are shown in FIGS. 14A-14J): manually, semi-automatically, autonomously, and/or otherwise transitioned between configurations. In an example, the vehicle system can be hitched to the fifth wheel of a tractor by the conventional (e.g., manual) process for hitching a trailer (e.g., establishing a fifth wheel coupling at the tractor interface). In a second example, a trailer can be hitched to the vehicle system (at the trailer interface) by a conventional manual process. Alternatively, tractor/trailer hitching can be partially or fully automated/autonomous.

5. Variants

In a first set of variants, an electric vehicle (EV) system configured to connect between a semi-tractor and a trailer, the EV system includes: a chassis defining a sagittal plane; a kingpin assembly configured to couple the chassis to a fifth wheel of the semi-tractor, the kingpin assembly comprising: a multi-axis sensor assembly, comprising a first force sensor and second force sensor configured to measure forces along a first axis and a second axis, respectively, wherein the first axis and second axis are orthogonal and in the sagittal plane; a secondary fifth wheel mounted to the chassis and configured to couple the trailer to the chassis; and an electric drivetrain comprising: a traction motor and a drive axle. The multi-axis sensor assembly can further include a third force sensor configured to measure lateral forces along a third axis, the third axis orthogonal to the sagittal plane. In a first variation, the first force sensor and the third force sensor are integrated into a kingpin of the kingpin assembly. For example, the second force sensor can be integrated into a body structure which is rigidly coupled to a kingpin. In a second variation, the second force sensor is mechanically coupled to the chassis.

In one or more variants, the first force sensor and second force sensor are integrated into a rigid body.

In one or more variants, force measurements from the first force sensor and the second force sensor are fused to estimate a longitudinal force between the semi-tractor and the kingpin assembly, wherein the electric drivetrain is controlled based on the longitudinal force.

In one or more variants, the first axis comprises a longitudinal axis of the EV system, wherein the second axis comprises a vertical axis of the EV system.

In one or more variants, a distance between the kingpin assembly and the secondary fifth wheel is adjustable.

In one or more variants, the second force sensor comprises a load cell.

In one or more variants, the first force sensor comprises a strain gauge.

In a second set of variants, nonexclusive with the first set of variants, a vehicle system configured to connect between a semi-tractor and a trailer comprises: a chassis defining a sagittal plane; a kingpin assembly configured to couple the chassis to a fifth wheel of the semi-tractor, the kingpin assembly comprising: a multi-axis sensor assembly, comprising a first force sensor and second force sensor configured to measure forces along a first axis and a second axis, respectively, wherein the first axis and second axis are orthogonal and in the sagittal plane; and a secondary fifth wheel mounted to the chassis.

In one or more variants, the multi-axis sensor assembly further comprises a third force sensor configured to measure lateral forces along a third axis, the third axis orthogonal to the sagittal plane.

In one or more variants, the first force sensor and the third force sensor are integrated into a kingpin of the kingpin assembly.

In a third set of variants, nonexclusive with the first or second sets of variants, a sensory kingpin system for a vehicle comprises: a kingpin body; a first force sensor and a second force sensor integrated into the kingpin body and configured to measure forces along a first axis and a second axis, respectively, wherein the first axis and second axis are orthogonal; and a third force sensor mechanically coupled to the kingpin and configured to measure force along a third axis, wherein the first axis and the third axis are orthogonal in a midsagittal plane of the vehicle.

In one or more variants, the third force sensor is integrated into the kingpin body.

In one or more variants, the third force sensor is integrated into a rigid body structure which is mechanically coupled to the kingpin body.

In one or more variants, the first force sensor comprises a load cell.

In one or more variants, the first force sensor comprises a strain gauge.

In one or more variants, the sensory kingpin is coupled to a controller which is configured to estimate a longitudinal force at the kingpin by fusing measurements from the first, second, and third force sensors.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPU, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. An electric vehicle (EV) system configured to connect between a semi-tractor and a trailer, the EV system comprising:
- a chassis defining a sagittal plane;
- a kingpin assembly configured to couple the chassis to a fifth wheel of the semi-tractor, the kingpin assembly comprising:
  - a multi-axis sensor assembly, comprising a first force sensor and second force sensor configured to measure forces along a first axis and a second axis, respectively, wherein the first axis and second axis are orthogonal and in the sagittal plane;
- a secondary fifth wheel mounted to the chassis and configured to couple the trailer to the chassis; and
- an electric drivetrain comprising: a traction motor and a drive axle.

2. The EV system of claim 1, wherein the multi-axis sensor assembly further comprises a third force sensor configured to measure lateral forces along a third axis, the third axis orthogonal to the sagittal plane.

3. The EV system of claim 2, wherein the first force sensor and the third force sensor are integrated into a kingpin of the kingpin assembly.

4. The EV system of claim 3, wherein the second force sensor is integrated into a body structure which is rigidly coupled to a kingpin.

5. The EV system of claim 3, wherein the second force sensor is mechanically coupled to the chassis.

6. The EV system of claim 1, wherein the first force sensor and second force sensor are integrated into a rigid body.

7. The EV system of claim 1, wherein force measurements from the first force sensor and the second force sensor are fused to estimate a longitudinal force between the semi-tractor and the kingpin assembly, wherein the electric drivetrain is controlled based on the longitudinal force.

8. The EV system of claim 1, wherein the first axis comprises a longitudinal axis of the EV system, wherein the second axis comprises a vertical axis of the EV system.

9. The EV system of claim 1, wherein a distance between the kingpin assembly and the secondary fifth wheel is adjustable.

10. The EV system of claim 1, wherein the second force sensor comprises a load cell.

11. The EV system of claim 1, wherein the first force sensor comprises a strain gauge.

12. A vehicle system configured to connect between a semi-tractor and a trailer, the vehicle system comprising:
- a chassis defining a sagittal plane;
- a kingpin assembly configured to couple the chassis to a fifth wheel of the semi-tractor, the kingpin assembly comprising:
  - a multi-axis sensor assembly, comprising a first force sensor and second force sensor configured to measure forces along a first axis and a second axis, respectively, wherein the first axis and second axis are orthogonal and in the sagittal plane; and
- a secondary fifth wheel mounted to the chassis.

13. The vehicle system of claim 12, the multi-axis sensor assembly further comprising a third force sensor configured to measure lateral forces along a third axis, the third axis orthogonal to the sagittal plane.

14. The vehicle system of claim 12, wherein the first force sensor and the third force sensor are integrated into a kingpin of the kingpin assembly.

15. A sensory kingpin system for a vehicle, the system comprising:
- a kingpin body;
- a first force sensor and a second force sensor integrated into the kingpin body and configured to measure forces along a first axis and a second axis, respectively, wherein the first axis and second axis are orthogonal; and
- a third force sensor mechanically coupled to the kingpin and configured to measure force along a third axis, wherein the first axis and the third axis are orthogonal in a midsagittal plane of the vehicle.

16. The sensory kingpin of claim 15, wherein the third force sensor is integrated into the kingpin body.

17. The sensory kingpin of claim 15, wherein the third force sensor is integrated into a rigid body structure which is mechanically coupled to the kingpin body.

18. The sensory kingpin of claim 15, wherein the first force sensor comprises a load cell.

19. The sensory kingpin of claim 15, wherein the first force sensor comprises a strain gauge.

20. The sensory kingpin of claim 15, wherein the sensory kingpin is coupled to a controller which is configured to estimate a longitudinal force at the kingpin by fusing measurements from the first, second, and third force sensors.

* * * * *